(12) United States Patent
Ouchi

(10) Patent No.: US 6,366,398 B1
(45) Date of Patent: *Apr. 2, 2002

(54) OBSERVATION APPARATUS

(75) Inventor: Yumiko Ouchi, Tokyo (JP)

(73) Assignee: Nikon Corporation, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/684,811

(22) Filed: Jul. 22, 1996

(30) Foreign Application Priority Data

Aug. 17, 1995 (JP) .............................................. 7-231949
Mar. 22, 1996 (JP) .............................................. 8-066193

(51) Int. Cl.⁷ .......................... G02B 21/00; G03B 13/06
(52) U.S. Cl. ........................ 359/381; 359/368; 359/380; 359/432
(58) Field of Search ................................ 359/362, 368, 359/380–381, 388, 420–422, 432, 656–661, 672–675, 821

(56) References Cited

U.S. PATENT DOCUMENTS

| | | | |
|---|---|---|---|
| 3,481,665 A | * 12/1969 | Rosenberger | 359/381 |
| 4,027,951 A | 6/1977 | Mori et al. | 359/661 |
| 4,451,126 A | * 5/1984 | Riesenberg et al. | 359/381 |
| 4,563,062 A | * 1/1986 | Kanatani | 359/379 |
| 4,946,265 A | * 8/1990 | Shimizu et al. | 359/381 |
| 5,519,531 A | * 5/1996 | Sato | 359/368 |

FOREIGN PATENT DOCUMENTS

| | | |
|---|---|---|
| JP | 58-192012 | 11/1983 |
| JP | 62-62316 | 3/1987 |
| JP | 2-178608 | 7/1990 |

* cited by examiner

Primary Examiner—Thong Nguyen
(74) Attorney, Agent, or Firm—Foley & Lardner

(57) ABSTRACT

The observation apparatus of the present invention has a basic structure as a normal microscope with an objective system constituted by an interchangeable objective unit attached to a revolver and a tube lens unit fixed at a position to which a light beam is guided from the objective unit. Particularly, the observation apparatus has a mechanism capable of setting a special optical system (auxiliary lens unit) constituting part of the objective unit on the optical axis of the objective system between the revolver and the tube lens unit. A partial objective unit constituting part of the objective unit is attached to the revolver to constitute the objective unit by the partial objective unit and the auxiliary lens unit. In this manner, the objective unit for a very low magnification whose total length is larger than the parfocal distance for the objective in this apparatus can be constituted.

37 Claims, 23 Drawing Sheets

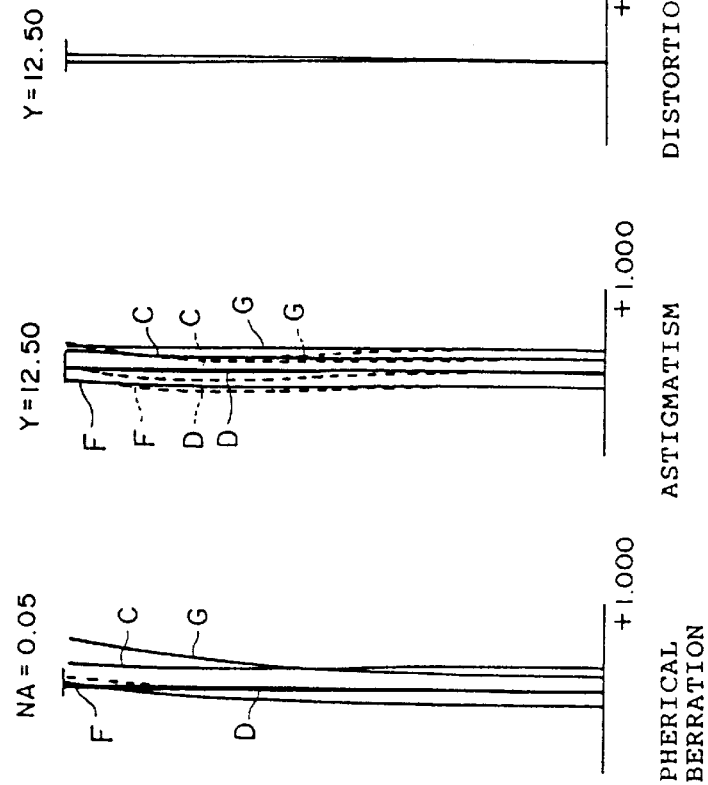
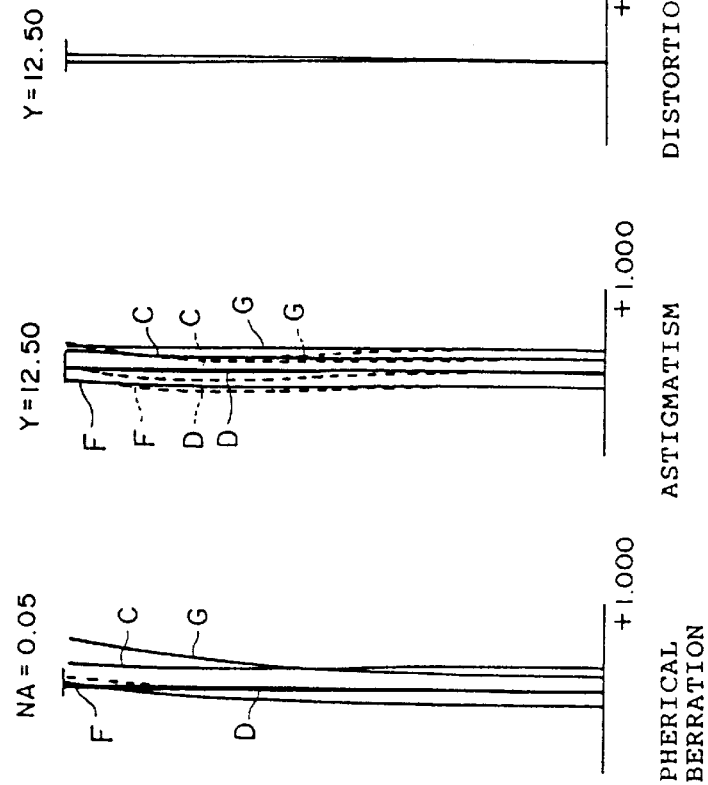
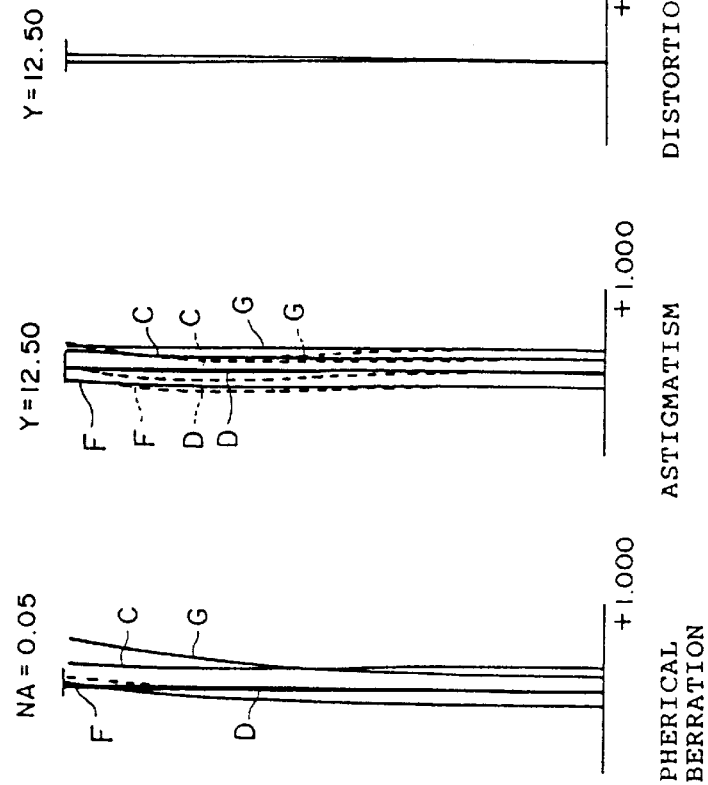
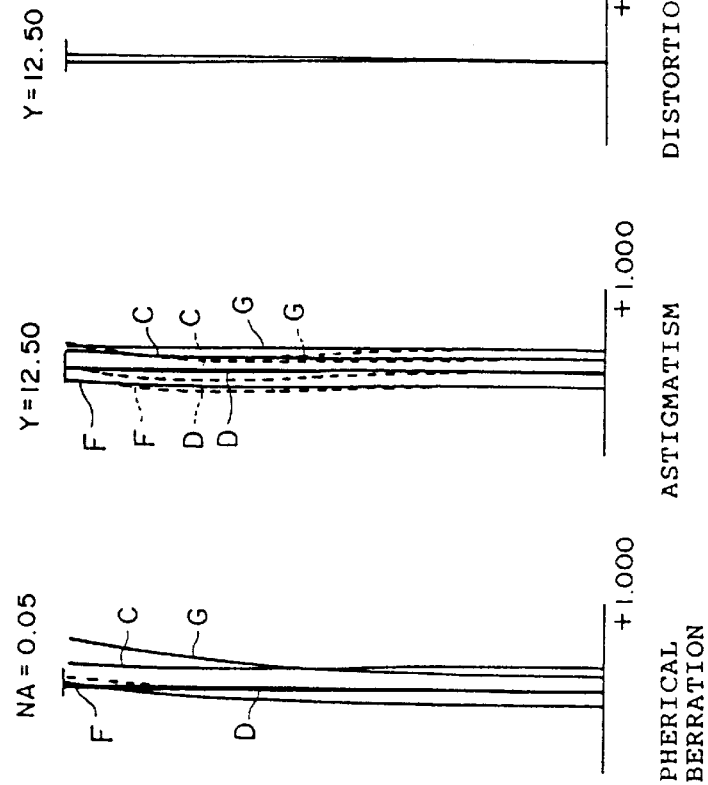
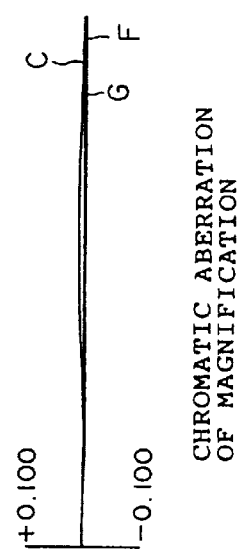

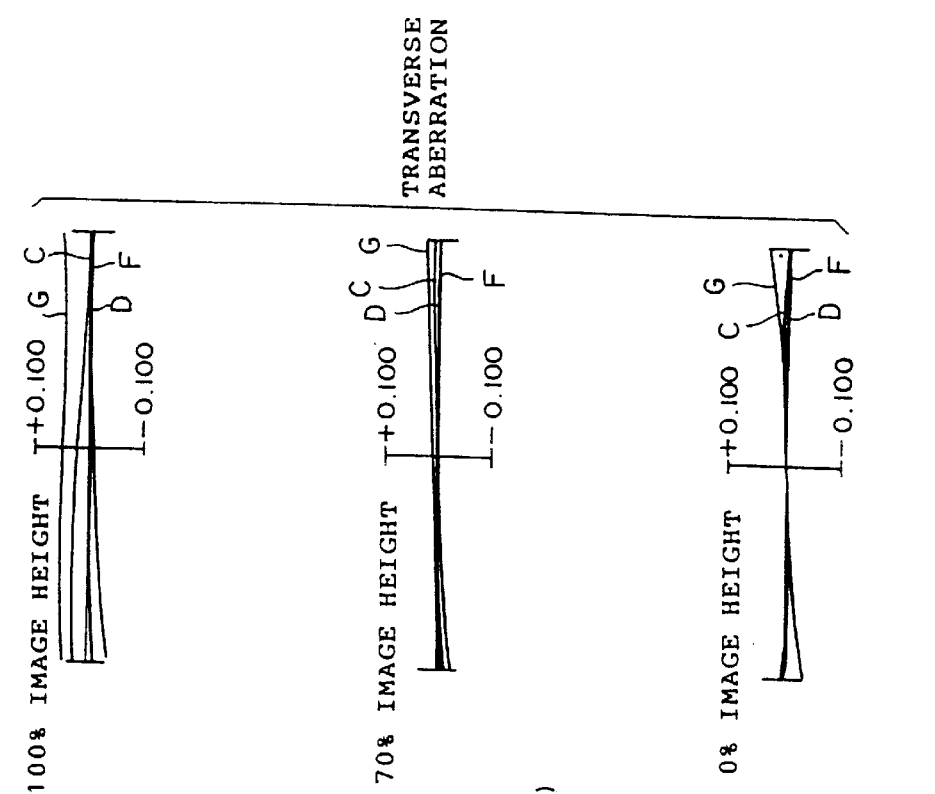
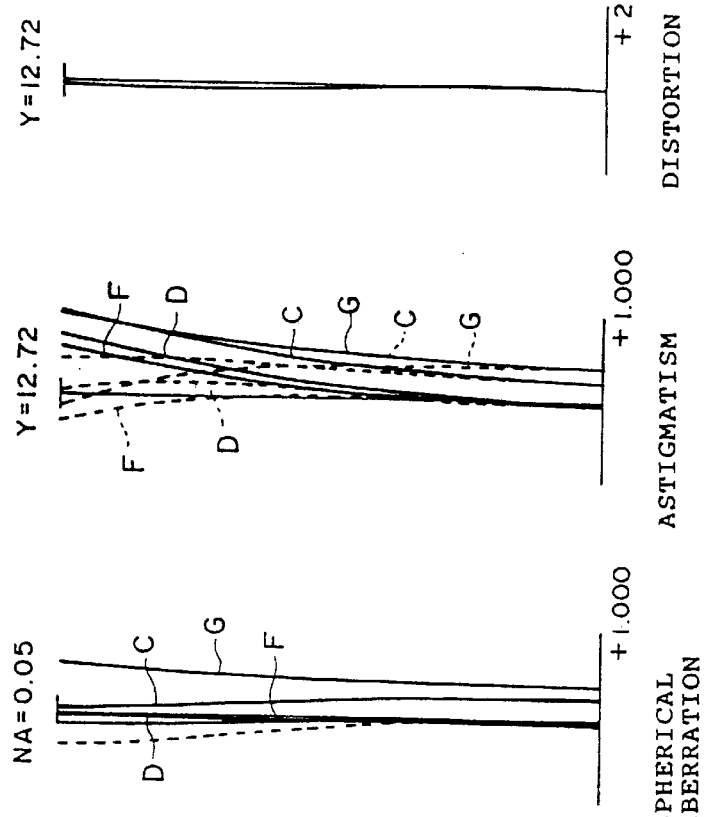
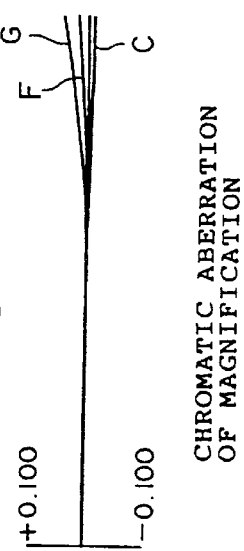

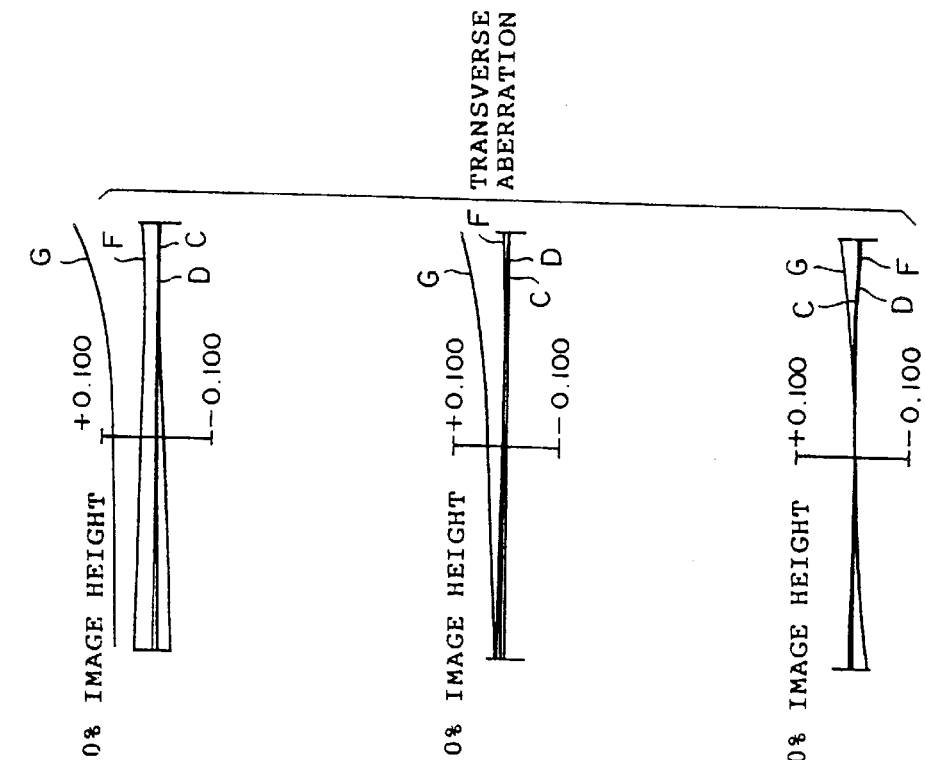
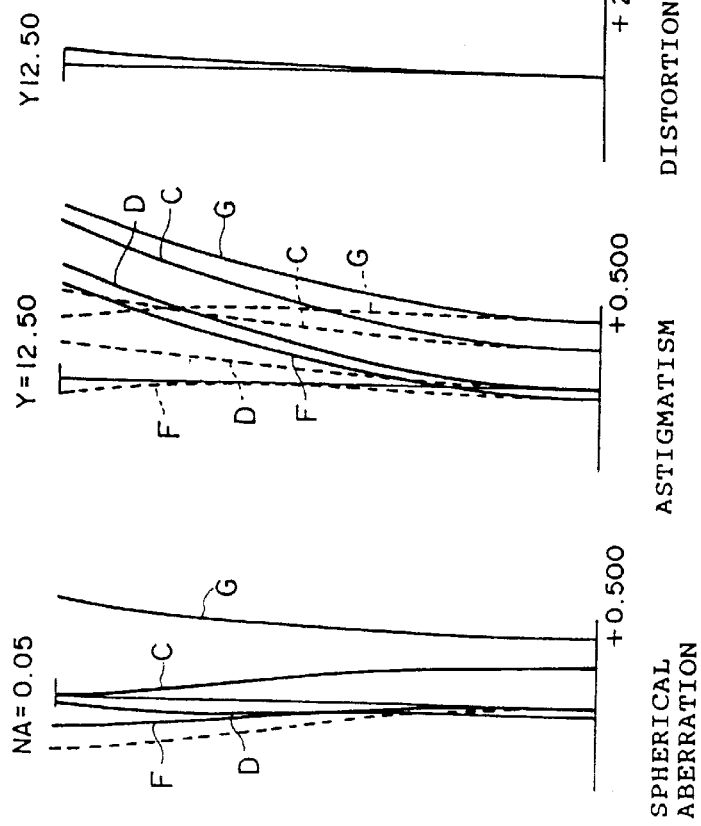
Fig. 37    Fig. 38    Fig. 39
Fig. 40
Fig. 41

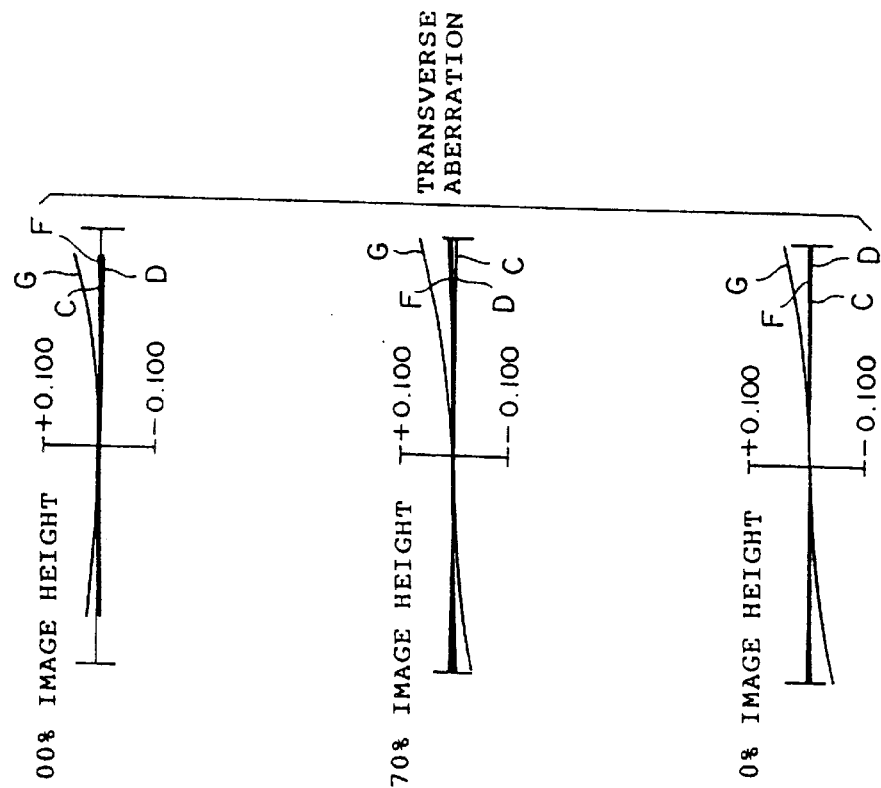
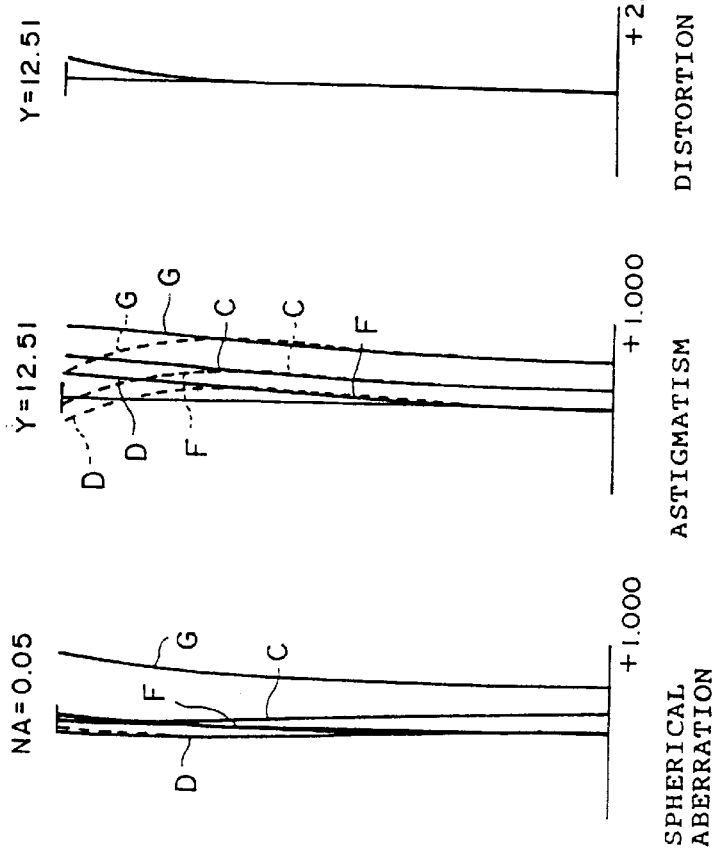
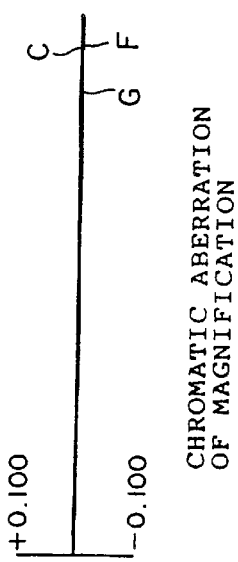

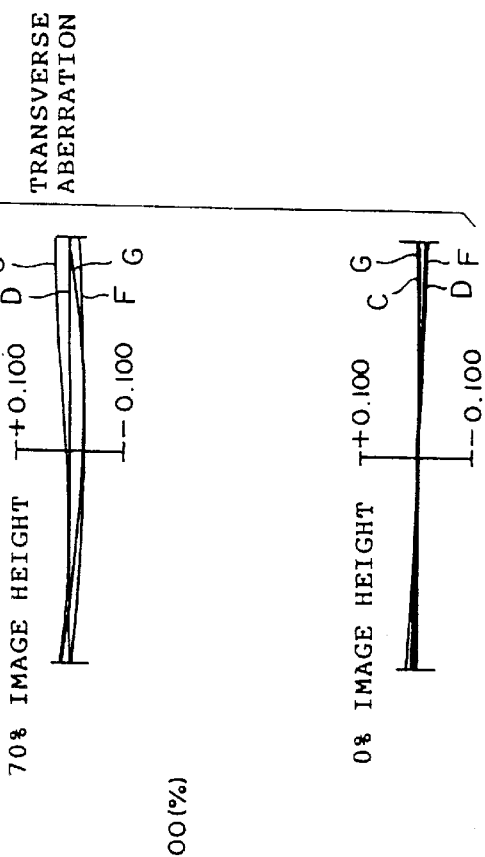

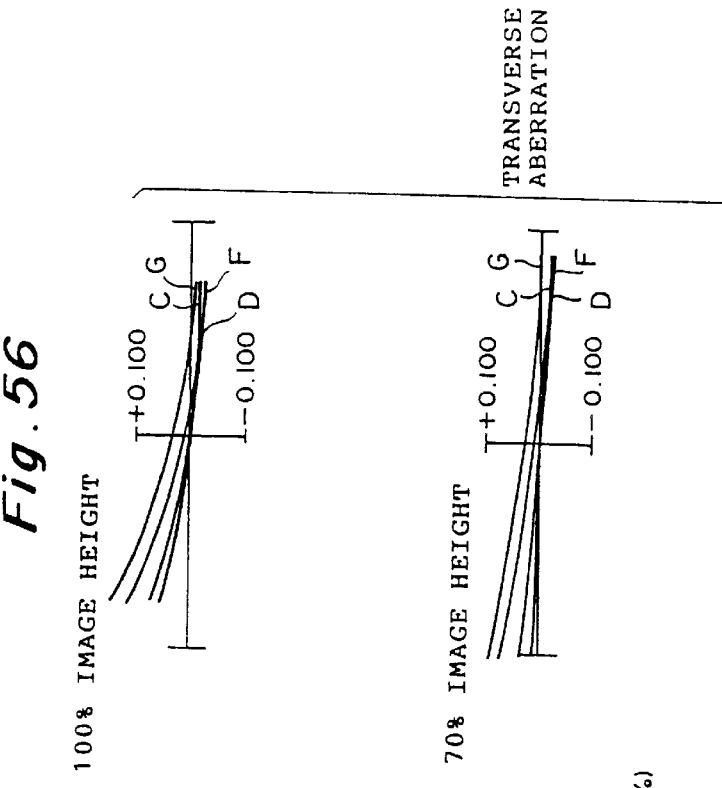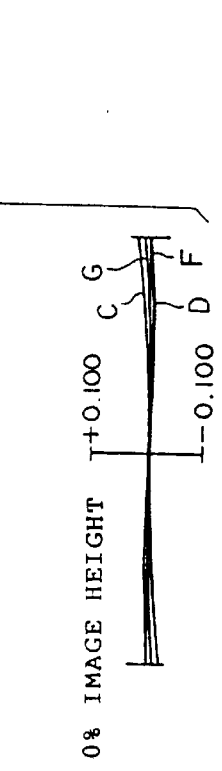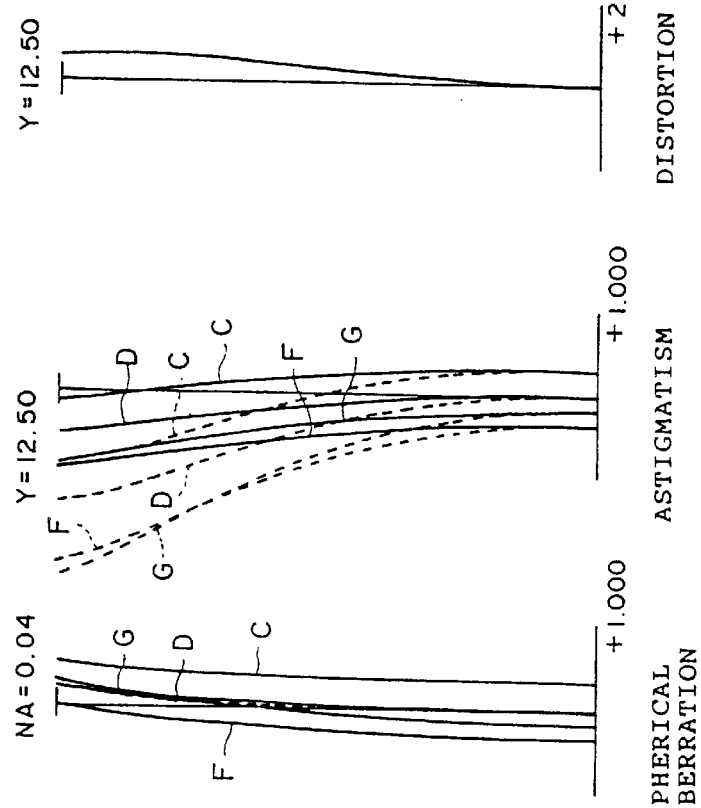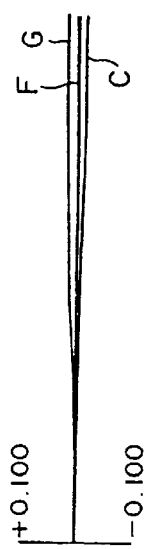

OBSERVATION APPARATUS

BACKGROUND OF THE INVENTION

1. Field of the Invention

The present invention relates to an observation apparatus for observing or photographing an object image at a predetermined magnification and, more particularly, to an infinity objective system capable of observing a target sample surface at a very low magnification in a wide field of view. Note that the very low magnification means a magnification of about 1.5× or less in the present invention.

2. Related Background Art

In general, an interchangeable objective mounted on the revolver of a microscope must be designed such that its total length falls within the parfocal distance for the objective (distance along the optical axis between a stage surface for mounting a sample and the reference plane of the revolver used when the objective is mounted on the revolver).

If, therefore, an objective for a very low magnification of, e.g., 1× or less is to be designed, a required focal length increases, and it becomes difficult to make the total length fall within the parfocal distance for the objective. As a result, a conventional microscope has no objective for a very low magnification of 1× or less and attachable to a revolver.

As described above, when a wide-range image of the target sample surface is to be observed or photographed, a conventional microscope cannot meet this demand. This case is coped with by using apparatuses such as a stereomicroscope and a macro camera, other than a microscope. Therefore, it is necessary to use a microscope when the details of a sample are observed or photographed, and a stereomicroscope or a macro camera when the entire sample is observed or photographed. As a result, an observer must perform many cumbersome operations such as positioning of a sample each time an apparatus to be used is changed, resulting in a very low working efficiency.

SUMMARY OF THE INVENTION

It is an object of the present invention to provide an observation apparatus with an objective system which allows observation or photography of a sample in a wide range from a high magnification which can be realized by a normal microscope to a very low magnification which cannot be realized by the normal microscope. Therefore, the observation apparatus according to the present invention comprises a basic structure as a normal microscope with an objective system constituted by an interchangeable objective unit attached to a revolver and a tube lens unit fixed at a position to which a light beam is guided from the objective unit. Particularly, the observation apparatus according to the present invention comprises a mechanism capable of setting a special optical system (auxiliary lens unit) constituting part of the objective unit on the optical axis of the objective system between the revolver and the tube lens unit. A partial objective unit constituting part of the objective unit is attached to the revolver to constitute the objective unit for a very low magnification by the partial objective unit and the auxiliary lens unit. In this manner, the objective unit whose total length is larger than the parfocal distance for the objective in this apparatus can be constituted.

With the above arrangement, the objective system in the observation apparatus according to the present invention comprises an arrangement (first aspect) realized by the partial objective unit attached to the revolver, the auxiliary lens unit (the partial objective unit and the auxiliary lens unit constitute the objective unit for a very low magnification), and the tube lens unit fixed at a predetermined position so as to realize observation or photography at a very low magnification, and an arrangement (second aspect) realized by the objective and tube lens units for microscopic observation.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIGS. 17 to 21 are graphs showing various aberrations in the objective unit for a very low magnification having the first lens arrangement shown in FIG. 9, in which FIG. 17 shows a spherical aberration, FIG. 18 shows an astigmatism, FIG. 19 shows a distortion, FIG. 20 shows a chromatic aberration of magnification, and FIG. 21 shows respective transverse aberrations for 100%, 70%, and 0% image heights in the order from the above;

FIGS. 22 to 26 are graphs showing various aberrations in the objective unit for a very low magnification having the second lens arrangement shown in FIG. 10, in which FIG. 22 shows a spherical aberration, FIG. 23 shows an astigmatism, FIG. 24 shows a distortion, FIG. 25 shows a chromatic aberration of magnification, and FIG. 26 shows respective transverse aberrations for 100%, 70%, and 0% image heights in the order from the above;

FIGS. 27 to 31 are graphs showing various aberrations in the objective unit for a very low magnification having the third lens arrangement shown in FIG. 11, in which FIG. 27 shows a spherical aberration, FIG. 28 shows an astigmatism, FIG. 29 shows a distortion, FIG. 30 shows a chromatic aberration of magnification, and FIG. 31 shows respective transverse aberrations for 100%, 70%, and 0% image heights in the order from the above;

FIGS. 32 to 36 are graphs showing various aberrations in the objective unit for a very low magnification having the fourth lens arrangement shown in FIG. 12, in which FIG. 32 shows a spherical aberration, FIG. 33 shows an astigmatism, FIG. 34 shows a distortion, FIG. 35 shows a chromatic aberration of magnification, and FIG. 36 shows respective transverse aberrations for 100%, 70%, and 0% image heights in the order from the above;

FIGS. 37 to 41 are graphs showing various aberrations in the objective unit for a very low magnification having the fifth lens arrangement shown in FIG. 13, in which FIG. 37 shows a spherical aberration, FIG. 38 shows an astigmatism, FIG. 39 shows a distortion, FIG. 40 shows a chromatic aberration of magnification, and FIG. 41 shows respective transverse aberrations for 100%, 70%, and 0% image heights in the order from the above;

FIGS. 42 to 46 are graphs showing various aberrations in the objective unit for a very low magnification having the sixth lens arrangement shown in FIG. 14, in which FIG. 42 shows a spherical aberration, FIG. 43 shows an astigmatism, FIG. 44 shows a distortion, FIG. 45 shows a chromatic aberration of magnification, and FIG. 46 shows respective transverse aberrations for 100%, 70%, and 0% image heights in the order from the above;

FIGS. 47 to 51 are graphs showing various aberrations in the objective unit for a very low magnification having the seventh lens arrangement shown in FIG. 15, in which FIG. 47 shows a spherical aberration, FIG. 48 shows an astigmatism, FIG. 49 shows a distortion, FIG. 50 shows a chromatic aberration of magnification, and FIG. 51 shows respective transverse aberrations for 100%, 70%, and 0% image heights in the order from the above; and FIGS. 52 to 56 are graphs showing various aberrations in the objective unit for a very low magnification having the eighth lens arrangement shown in FIG. 16, in which FIG. 52 shows a spherical aberration, FIG. 53 shows an astigmatism, FIG. 54 shows a distortion, FIG. 55 shows a chromatic aberration of magnification, and FIG. 56 shows respective transverse aberrations for 100%, 70%, and 0% image heights in the order from the above.

DESCRIPTION OF THE PREFERRED EMBODIMENTS

Figure 1:
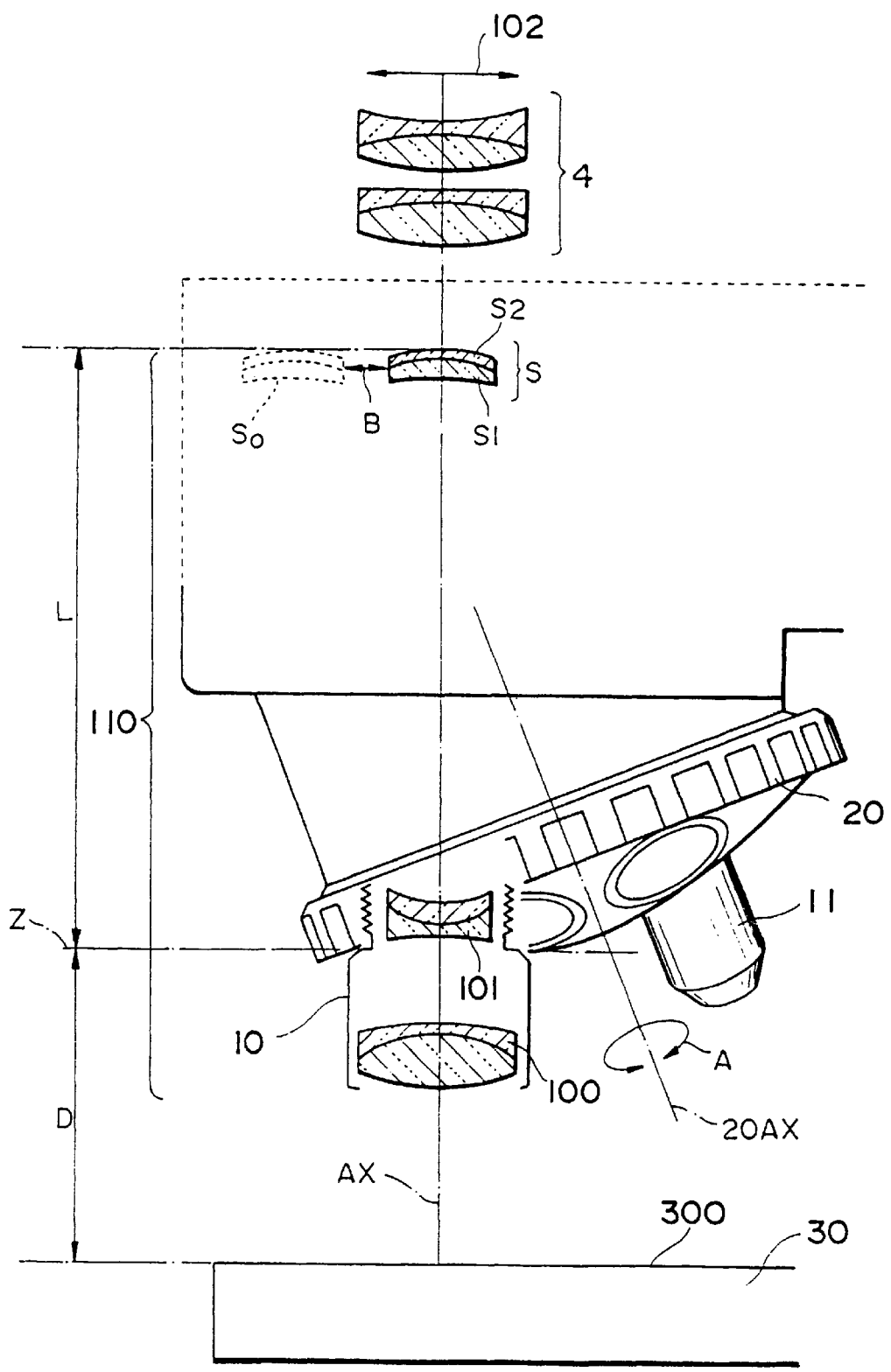
FIG. 1 is a view showing the schematic arrangement of the main part in an observation apparatus according to the present invention so as to explain respective parameters and the like used in this specification.

More specifically, as shown in FIG. 1, the observation apparatus according to the present invention comprises a stage 30 capable of holding a sample on a major surface 300, a revolver 20 to which a partial objective unit 10 constituting part of an objective unit 110 for a very low magnification and/or an objective unit 11 for microscopic observation can be attached, an auxiliary lens unit S which is positioned between the revolver 20 and a fixed tube lens unit 4 positioned on a side opposite to the stage 30 with respect to the revolver 20 and constitutes the objective unit 110 for a very low magnification together with the partial objective unit 10 set on an optical axis Ax of the objective system when the auxiliary lens unit S is set on the optical axis Ax, and a driving mechanism for moving the auxiliary lens unit S. The driving mechanism sets the auxiliary lens unit S to at least either of a predetermined position (the auxiliary lens unit S position indicated by a solid line in FIG. 1) on the optical axis Ax of the objective system and a position (an auxiliary lens unit So position indicated by a broken line in FIG. 1) offset from the optical axis Ax of the objective system.

Note that the revolver 20 is rotatable in a direction indicated by an arrow A in FIG. 1 about a rotational axis 20Ax. The revolver 20 is rotated in the direction of the arrow A to coincide the optical axis of the lens unit 10 or 11 which is attached to the revolver 20 with the optical axis Ax of the objective system. The auxiliary lens unit S is movable in a direction indicated by an arrow B in FIG. 1 by the driving mechanism.

Figure 5:
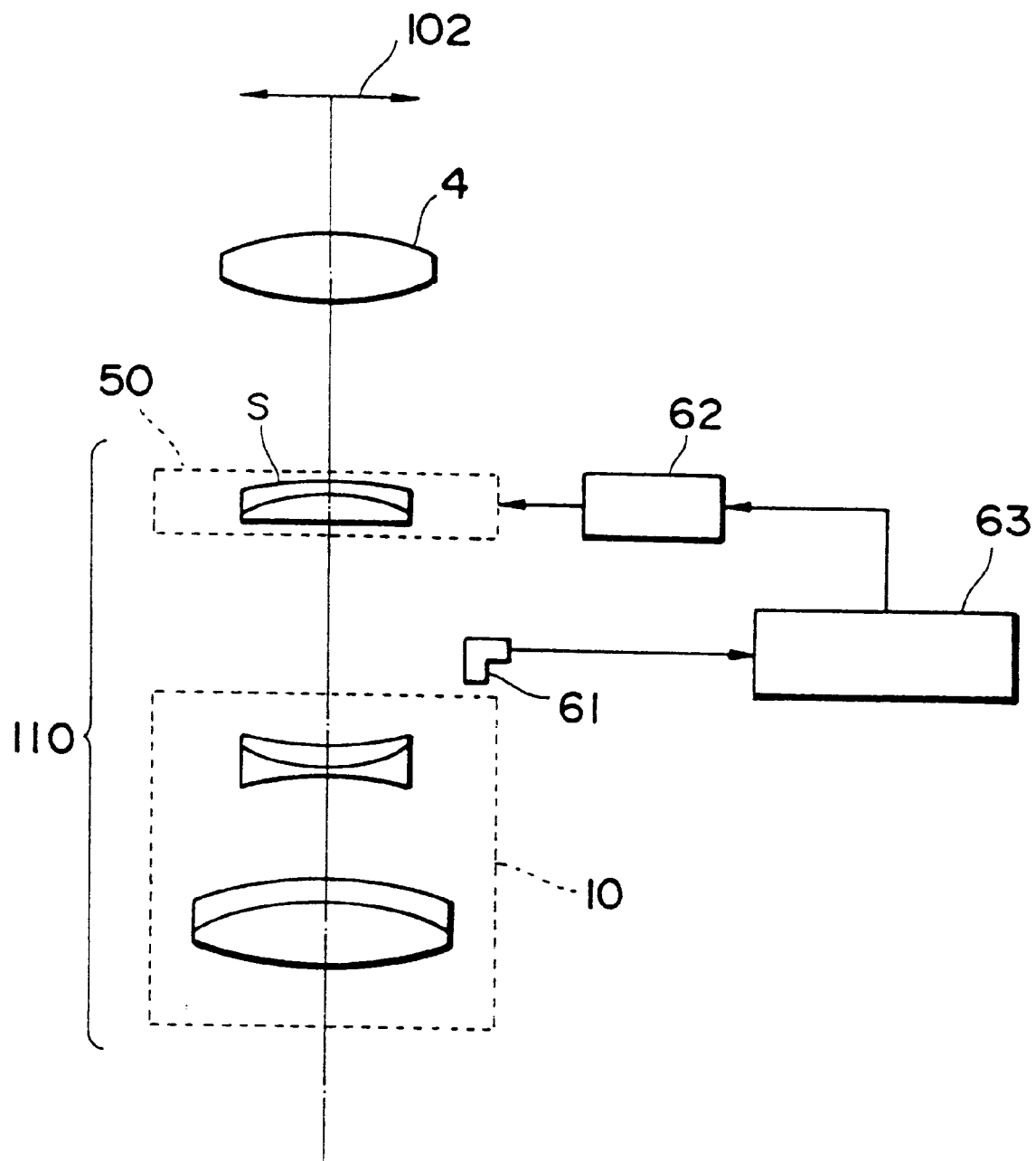
FIG. 5 is a view showing the schematic arrangement of an application of a driving mechanism for an auxiliary lens unit, which is applicable to the observation apparatus according to the present invention.

The observation apparatus according to the present invention further comprises a sensor 61 for detecting a state in which the partial objective unit 10 attached to the revolver 20 is set on the optical axis of the objective system, and a controller 63 for controlling the driving mechanism so as to set the auxiliary lens unit S to at least either of a predetermined position on the optical axis Ax of the objective system and a position offset from the optical axis Ax on the basis of information from the sensor 61 (see FIG. 5). Note that this driving mechanism includes a moving unit 50 attached to the auxiliary lens unit S, and an actuator 62 for moving the moving unit 50 in accordance with an instruction from the controller 63. With this arrangement, the setting position of the auxiliary lens unit S can be automatically changed in a manner interlocked with the switching operation of the objective unit 11 or the partial objective unit 10 which is attached to the revolver 20. Note that, in FIG. 1, reference numeral 102 denotes the image of a sample placed on the major surface 300 of the stage 30, which image 102 is formed via the objective system for a very low magnification constituted by the partial objective unit 10, the auxiliary lens unit S, and the tube lens unit 4.

Particularly, the partial objective unit 10 comprises a first lens unit 100 (front lens unit) with a positive refracting power and a second lens unit 101 (rear lens unit) with a negative refracting power and positioned on the tube lens unit side with respect to the first lens unit 100 when the partial objective unit 10 is set on the optical axis Ax of the objective system. The auxiliary lens unit S includes a cemented lens composed of a first lens S1 and a second lens S2.

In the observation apparatus according to the present invention, the partial objective unit 10 constituting the objective system (first aspect) for a very low magnification is characterized by a wide real field of view because the partial objective unit 10 is part of the objective unit for observing an image in a wide field of view with a microscope. The illumination of this apparatus is generally Köhler illumination, and a sample is subjected to telecentrical illumination. For this reason, a lens element on the most sample side (object side) must have a lens diameter almost equal to or larger than the real field of view. Since a portion of the object unit to be mounted on the revolver has a predetermined screw diameter, the diameter of a light beam passing through this position must be made smaller than this screw diameter. Therefore, the first lens unit 100 of the partial objective unit 10 is given a positive refracting power to condense a light beam from a wide field of view.

The objective unit 110 (the partial objective unit 10 and the auxiliary lens unit S) for a very low magnification according to the present invention is characterized by a long parfocal distance for the objective because of its very low magnification. The objective unit 110 of the present invention is obtained by arranging, in the following order from the object side (stage side) to the image side (tube lens unit side), the auxiliary lens unit S with a positive refracting power and the second lens unit 101 with a negative refracting power. The telephoto ratio is determined by the lens unit with a positive refracting power and the lens unit with a negative refracting power. With this arrangement, the total length can be shortened, as compared to the focal length.

Owing to the above reason, the objective unit 110 for a very low magnification according to the present invention is constituted by, in the following order from the object side to the image side, the first lens unit 100 with a positive refracting power, the second lens unit 101 with a negative refracting power, and the auxiliary lens unit S with a positive refracting power. The first and second lens units 100 and 101 constitute the partial objective unit 10 attachable to the revolver 20. The auxiliary lens unit S positioned on the tube lens unit side with respect to the revolver 20 is constituted to be freely inserted/removed in/from the optical axis between the revolver 20 and the tube lens unit 4, and is used as the objective unit 110 for a very low magnification in combination with the partial objective unit 10.

To perform observation or photography at a very low magnification, when the objective system is constituted by the partial objective unit 10 set on the optical axis Ax of the objective system, the auxiliary lens unit S set on the optical axis Ax, and the tube lens unit 4, the observation apparatus having the above arrangement satisfies the following conditions:

$$1 \leq (D+L)/fS \leq 1.5 \quad (1)$$

$$50 \leq L \leq 200 \quad (2)$$

$$12 \leq |v1S - v2S| \quad (3)$$

where D is the parfocal distance for the objective in the observation apparatus, fS is the focal length of the auxiliary lens unit S, v1S is an Abbe number of a lens (first lens S1) having the largest Abbe number within lenses in the auxiliary lens unit S, v2S is an Abbe number of a lens (second lens S2) having the smallest Abbe number within lenses in the auxiliary lens unit S, and L is the distance between an attachment reference plane Z of the revolver 20 for the partial objective unit 10 and a lens surface of the auxiliary lens unit S which is closest to the tube lens unit.

Condition (1) defines the relationship between the position of the auxiliary lens unit S on the optical axis Ax and its focal length. Condition (1) affects the working distance and the parfocal distance for the objective. When the ratio of condition (1) is above the upper limit, the front (object side) focal position of the auxiliary lens unit S shifts nearer to the image side than the attachment reference plane Z, resulting in a larger total length of the partial objective unit 10 than the parfocal distance for the objective. When the ratio of condition (1) is below the lower limit, the front focal position of the auxiliary lens unit S shifts nearer to the object side than the attachment reference plane Z. Accordingly, the first and second lens units 100 and 101 of the partial objective unit 10 are arranged nearer to the object side, resulting in a short working distance.

Since the partial objective unit 10 constituting part of the objective unit 110 for a very low magnification is low in magnification and small in N.A., its focal depth is large. Therefore, to ensure a safe working distance and accommodate the partial objective unit 10 within the parfocal distance D for the objective with a margin, it is more preferable to set the upper and lower limit values of the ratio of condition (1) to 1.45 and 1.2, respectively.

Condition (2) defines the setting position of the auxiliary lens unit S. Condition (2) is also a factor associated with the shape of the observation apparatus. In general, a microscope is constituted by attaching a revolver to its arm serving as a main body and mounting an objective on the lower portion of the revolver. The observation apparatus allows observation or photography by further attaching a lens barrel to the upper portion of the arm.

When the numerical value of condition (2) is above the upper limit, the auxiliary lens unit S enters the lens barrel. Since the tube lens unit 4 is arranged higher than the auxiliary lens unit S, the tube lens unit 4 is increased in lens diameter, and the lens barrel becomes larger, resulting in a difficult use. When the numerical value of condition (2) is below the lower limit, the total length of the objective system is decreased. A large telephoto ratio must be ensured, resulting in a difficulty in balanced correction of various aberrations. To use a telephoto ratio appropriate for easy aberration correction and accommodate the auxiliary lens unit S within the arm, it is more preferable to set the upper and lower limits of the numerical value of condition (2) to 150 and 110, respectively.

Condition (3) defines a difference between the Abbe numbers of the first and second lenses S1 and S2 in the auxiliary lens unit S. Condition (3) is associated with a chromatic aberration on the axis Ax. When the numerical value of condition (3) is below the lower limit, the chromatic aberration on the axis Ax cannot be sufficiently corrected. It is more preferable to set the lower limit of the numerical value of condition (3) to 15.

Further, in the observation apparatus according to the present invention, when the objective system employs the first aspect (is constituted by the partial objective unit 10 set on the optical axis Ax, the auxiliary lens unit S set on the optical axis Ax, and the tube lens unit 4), the objective system preferably satisfies the following conditions:

$$|\beta a| \leq 1.5 \quad (4)$$

$$0.07 \leq f1a/fa \leq 0.25 \quad (5)$$

where βa is the composite lateral magnification of the objective system (the composite lateral magnification of the partial objective unit 10, the auxiliary lens unit S, and the tube lens unit 4), f1a is the focal length of the first lens unit 100 in the partial objective unit 10, and fa is the parfocal distance for the objective in the objective unit 110 for a very low magnification, which is constituted by the partial objective unit 10 and the auxiliary lens unit S.

Condition (4) indicates that the objective unit included in the objective system has an arrangement (first aspect) which allows observation at a very low magnification. Condition (4) is the premise of condition (5). Condition (5) defines the focal length of the first lens unit 100 of the partial objective unit 10 for a very low magnification. The focal length of the first lens unit 100 affects a chromatic aberration of magnification and the Petzval sum. When the ratio of condition (5) is above the upper limit, the Petzval sum increases, resulting in a great degradation in flatness (flatness of an image plane). When the ratio of condition (5) is below the lower limit, the refracting power of the first lens unit 100 increases, resulting in an increase in radius of curvature of a lens element constituting the first lens unit 100. As a result, a chromatic aberration of magnification abruptly changes when the image height increases, resulting in a difficulty in balanced correction of various aberrations in the objective unit 110. It is more preferable to set the upper and lower limits of the ratio of condition (5) to 0.2 and 0.1, respectively.

In addition, a plurality of types of partial objective units can be attached to the revolver 20 in the observation apparatus according to the present invention. Therefore, assuming that the partial objective units attached to the revolver 20 are defined as the first and second partial objective units, the objective system of the first aspect (first objective system) constituted by the first partial objective unit, the auxiliary lens unit S, and the tube lens unit 4, and the objective system of the first aspect (second objective system) constituted by the second partial objective unit, the auxiliary lens unit S, and the tube lens unit 4 have different magnifications. Note that each of the first and second partial objective units has the first lens unit 100 with a positive refracting power and the second lens unit 101 with a negative refracting power, as shown in FIG. 1.

In this case, the observation apparatus preferably satisfies the following condition:

$$1.25 \leq |\beta a|/|\beta b| \leq 2.75 \quad (6)$$

where βa is the composite lateral magnification of the first objective system, and βb is the composite lateral magnification of the second objective system.

Further, under condition (6), both the first and second objective systems preferably satisfy the following conditions:

$$0.1 \leq f1b/fb \leq 0.5 \quad (7)$$

$$0.2 \leq (t1b+t2b)/D \leq 0.8 \quad (8)$$

where f1b is the focal length of the first lens unit 100 in the selected one of the first and second partial objective units set on the optical axis Ax, fb is the composite focal length of the objective unit 110 for a very low magnification constituted by the selected one of the first and second partial objective units set on the optical axis Ax and the auxiliary lens unit S set on the optical axis Ax, t1b is the total value of the central thicknesses of the respective lenses of the first lens unit 100 in the selected one of the first and second partial objective units set on the optical axis Ax, t2b is the total value of the central thicknesses of the respective lenses of the second lens unit 101 in the selected one of the first and second partial objective units set on the optical axis Ax, and D is the parfocal distance for the objective in the observation apparatus.

Condition (7) defines the focal length of the first lens unit in each partial objective unit. The focal length of the first lens unit affects a chromatic aberration of magnification and the Petzval sum, as described above. Condition (7) is based on a case in which the magnification relationship between the first and second partial objective units satisfies condition (6). Note that each of the first and second partial objective units constitutes the objective unit 110 for a very low magnification when set on the optical axis Ax.

When the ratio of condition (7) is above the upper limit, the Petzval sum increases, resulting in a great degradation in flatness. When the ratio of condition (7) is below the lower limit, the refracting power of the partial objective unit itself increases, resulting in an increase in radius of curvature. As a result, a chromatic aberration of magnification abruptly changes when the image height increases, resulting in a difficulty in balanced correction of various aberrations in the objective unit 110. It is more preferable to set the upper and lower limits of the ratio of condition (7) to 0.3 and 0.15, respectively.

Condition (8) defines the total range of the central thicknesses of the respective lenses of the first and second partial objective units. This total value is associated with the object-to-image distance and the Petzval sum. When the ratio of condition (8) is above the upper limit, the Petzval sum increases, resulting in a great degradation in flatness. When the ratio of condition (8) is below the lower limit, the total length of the objective system is decreased, resulting in a difficulty in conforming to the fundamental rule of a constant object-to-image distance. It is more preferable to set the upper and lower limits of the ratio of condition (8) to 0.75 and 0.25, respectively.

In this manner, when the first and second partial objective units each constituting part of the objective unit 110 for a very low magnification are so constituted as to satisfy conditions (4) to (8), the auxiliary lens unit S can be commonly used in combination with them. With this arrangement, when a plurality of types of partial objective units are used to realize objective systems with magnifications different from each other within a very low magnification range so as to allow observation under a state of a plurality of magnifications in the very low magnification range, a plurality of types of auxiliary lens units S corresponding to the respective partial objective units need not be prepared, resulting in a cost reduction of the observation apparatus. In addition, it can be prevented for an observer from erroneously combining a selected partial objective unit and the auxiliary lens unit S when the auxiliary lens unit S is manually switched (an aspect of the driving mechanism).

Note that, when a plurality of types of partial objective units are not used, i.e., one type of partial objective unit is attached to the revolver 20 by alternately exchanging the partial objective units with each other, the premise of conditions (7) and (8) is not condition (6) but the following condition (9):

$$|\beta b| \leq 1.5 \quad (9)$$

where βb is the composite lateral magnification of a selected partial objective unit attached to the revolver 20, the auxiliary lens unit S, and the tube lens unit 4. In addition, the objective unit 110 for a very low magnification is constituted by this selected partial objective unit attached to the revolver 20, and the auxiliary lens unit S.

Figure 2:
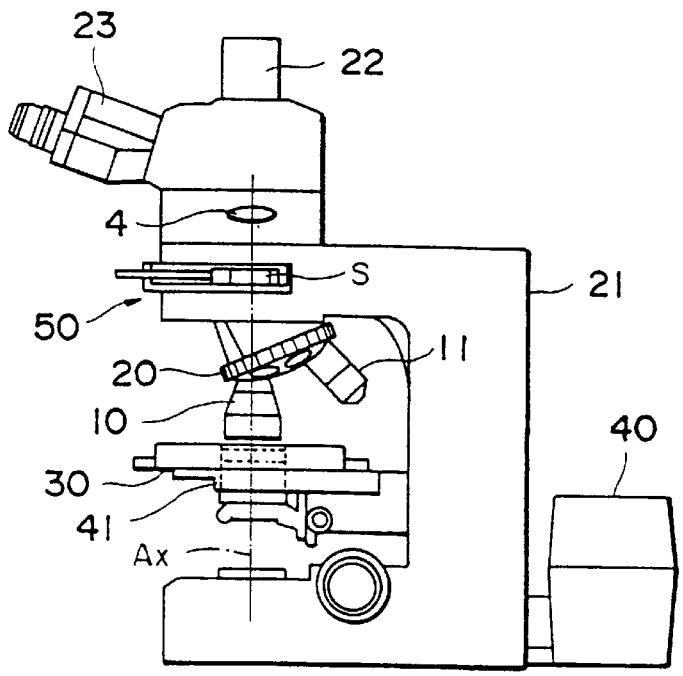
FIG. 2 is a view showing the arrangement of the observation apparatus according to the present invention, in which the arrangement of an objective system corresponds to the first aspect for observing or photographing a sample at a very low magnification.
Figure 3:
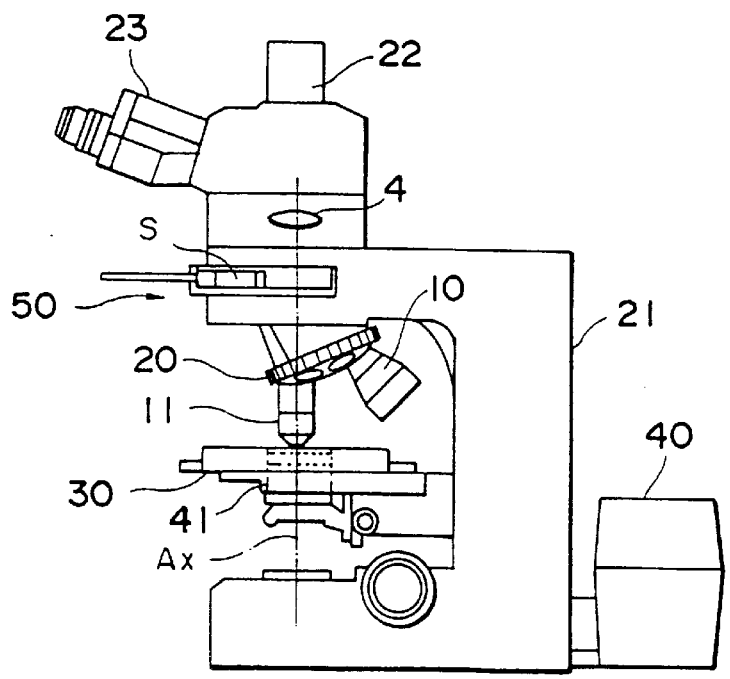
FIG. 3 is a view showing the arrangement of the observation apparatus according to the present invention, in which the arrangement of an objective system corresponds to the second aspect for normal microscopic observation or photography.

An observation apparatus according to the present invention will be described below with reference to the accompanying drawings. FIGS. 2 and 3 are schematic views showing the arrangement of the observation apparatus according to the present invention. Particularly, FIG. 2 shows the first aspect of an objective system in which a partial objective unit 10 constituting an objective unit 110 for a very low magnification and an auxiliary lens unit S are arranged on an optical axis Ax. FIG. 3 shows the second aspect of the objective system in which an objective unit 11 for normal microscopic observation is arranged on the optical axis Ax.

In FIG. 2, the partial objective unit 10 constituting part of the objective unit 110 for a very low magnification and the objective unit 11 for normal microscopic observation are mounted as a plurality of first objectives on a revolver 20. The revolver 20 is attached to an arm 21 as a microscope main body. A lens barrel 22 is attached to the upper portion of the arm 21. An eyepiece unit 23 for allowing visual observation of a sample image is attached to the lens barrel 22. A stage 30 for placing a sample on a major surface 300, and an illumination unit 40 for supplying illumination light are attached to the arm 21. The sample on the stage 30 is illuminated by illumination light emitted from the illumination unit 40 via a condenser lens 41.

In the objective system shown in FIG. 2, the partial objective unit 10 attached to the revolver 20 and constituting part of the objective unit for a very low magnification is positioned on the optical axis Ax of the objective system (the optical axis of the partial objective unit coincides with the optical axis Ax), while the auxiliary lens unit S is also positioned on the optical axis Ax (the optical axis of the auxiliary lens unit S coincides with the optical axis Ax). The auxiliary lens unit S is attached to a movable unit 50 for selectively moving the auxiliary lens unit S between a position on the optical axis Ax and a position offset from the optical axis Ax. Note that this movable unit 50 corresponds to a driving mechanism when the setting position of the auxiliary lens unit S is manually changed.

On the other hand, as shown in FIG. 3, when a sample is to be observed at a normal magnification (microscopic observation), the revolver 20 is rotated to position the objective unit 11 with a normal magnification attached to the revolver 20 on the optical axis Ax (the optical axis of the objective unit 11 is made to coincide with the optical axis Ax). The auxiliary lens unit S attached to the movable unit 50 is moved to a position offset from the optical axis Ax. Light from the illuminated sample forms an enlarged view of the sample via the objective unit 11 and the a tube lens unit 4 set in the lens barrel 22.

Further in FIG. 2, when a sample is to be observed at a very low magnification (e.g., about −0.5× to −1.5×), the revolver 20 is rotated to arrange the partial objective unit 10 attached to this revolver 20 on the optical axis Ax. The auxiliary lens unit S attached to the movable unit 50 is moved onto the optical axis Ax. Light from the illuminated sample forms a sample image 102 at a very low magnification via the partial objective unit 10, the auxiliary lens unit S, and the tube lens unit 4 in the lens barrel 22. Note that the revolver 20 may comprise another partial objective unit for a very low magnification different from that of the above-described objective system. When the revolver 20 is to be rotated to observe a sample by using this partial objective unit, the above auxiliary lens unit S is also positioned on the optical axis Ax.

Figure 4:
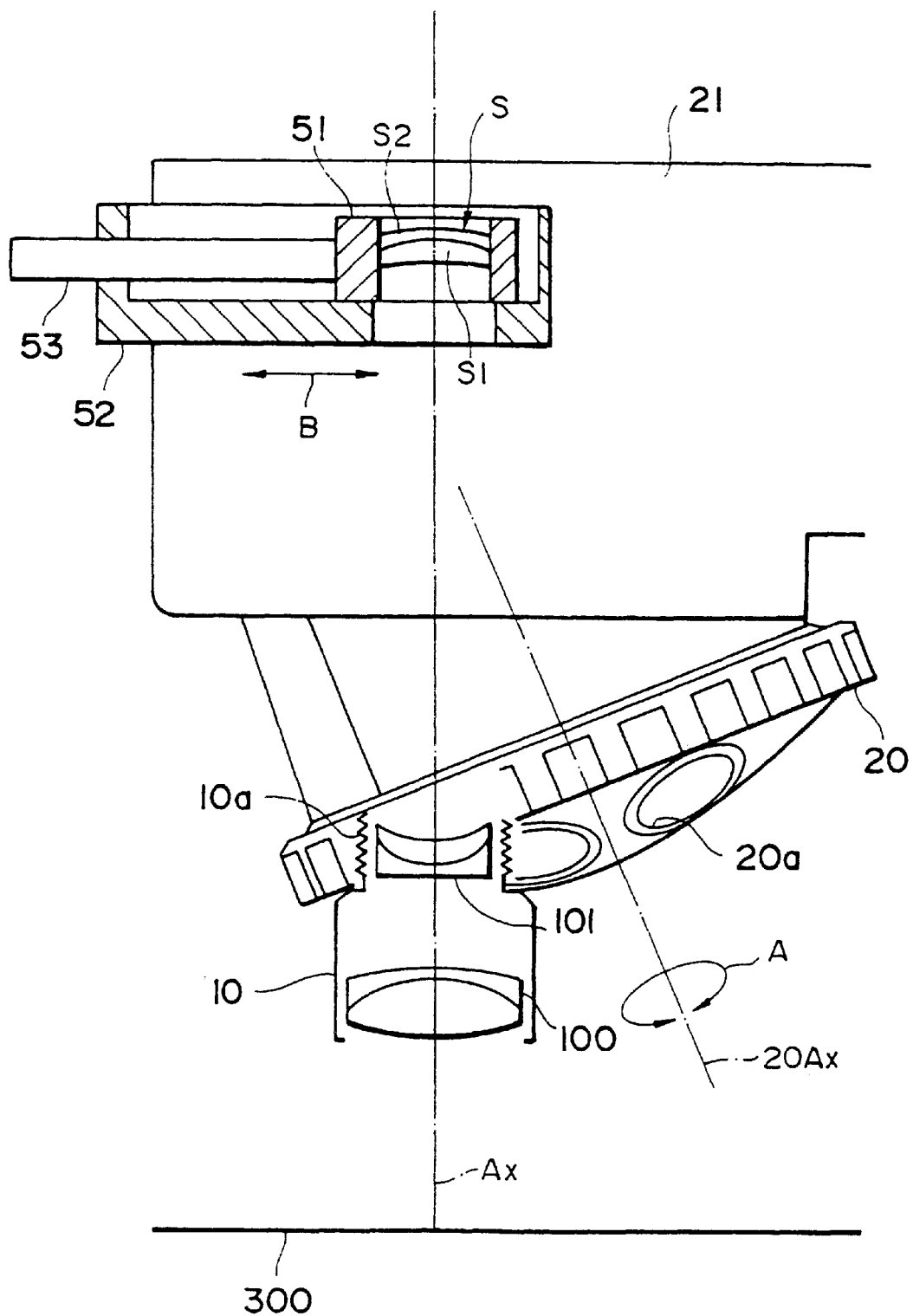
FIG. 4 is an enlarged view showing the arrangement of the main part in the observation apparatus according to the present invention.

Next, the revolver 20 and the movable unit 50 (included in the driving mechanism) will be described in detail with reference to FIG. 4. FIG. 4 is a view showing the main part of the observation apparatus shown in FIGS. 2 and 3.

In FIG. 4, the revolver 20 is rotatable in a direction indicated by an arrow A about a rotational axis 20Ax inclined with respect to the optical axis Ax. The revolver 20 has a plurality of opening portions 20a which are formed at positions separated from the rotational axis 20Ax by equal distances. Each opening portion 20a has an internal thread, which can be threadably engaged with an external thread 10a formed on the lens barrel of the partial objective unit 10 or the like. A plane which coincides with the opening surface of the opening portion 20a of the revolver 20 serves as an attachment reference plane Z for the partial objective unit 10.

The auxiliary lens unit S is accommodated in a lens frame 51. This lens frame 51 is accommodated in an outer frame 52 so as to be movable in a direction indicated by an arrow B with respect to the outer frame 52. A rod 53 is attached to the lens frame 51. An observer can selectively move the auxiliary lens unit S set in the lens frame 51 to a position on the optical axis Ax or a position offset from the optical axis Ax via this rod 53. Note that the outer frame 52 is detachably mounted on the arm 21.

As shown in FIG. 5, the revolver 20 may be provided with a sensor 61 for detecting a current type of the objective unit positioned on the optical axis. The movable unit 50 may be provided with an actuator 62 for selectively moving the auxiliary lens unit S to predetermined positions, and a controller 63 for driving the actuator 62 on the basis of information output from the sensor 61 may be arranged. In this case, for example, the sensor 61 outputs a predetermined signal when the partial objective unit 10 constituting part of the objective unit 110 for a very low magnification is positioned on the optical axis Ax, and the controller 63 drives the actuator 62 upon reception of the signal from the sensor 61 so as to position the auxiliary lens unit S on the optical axis Ax. Further, the sensor 61 outputs a signal different from the above signal when the objective unit (e.g., the objective unit 11 for microscopic observation) other than the partial objective unit 10 is positioned on the optical axis Ax, and the controller 63 drives the actuator 62 in accordance with this signal so as to retract the auxiliary lens unit S from the position on the optical axis Ax. With this arrangement, the auxiliary lens unit S can be automatically inserted/removed in/from the optical axis Ax in response to the switching operation of the objective units attached to the revolver 20.

The objective system of the observation apparatus according to respective embodiments of the present invention will be described below.

Figure 6:
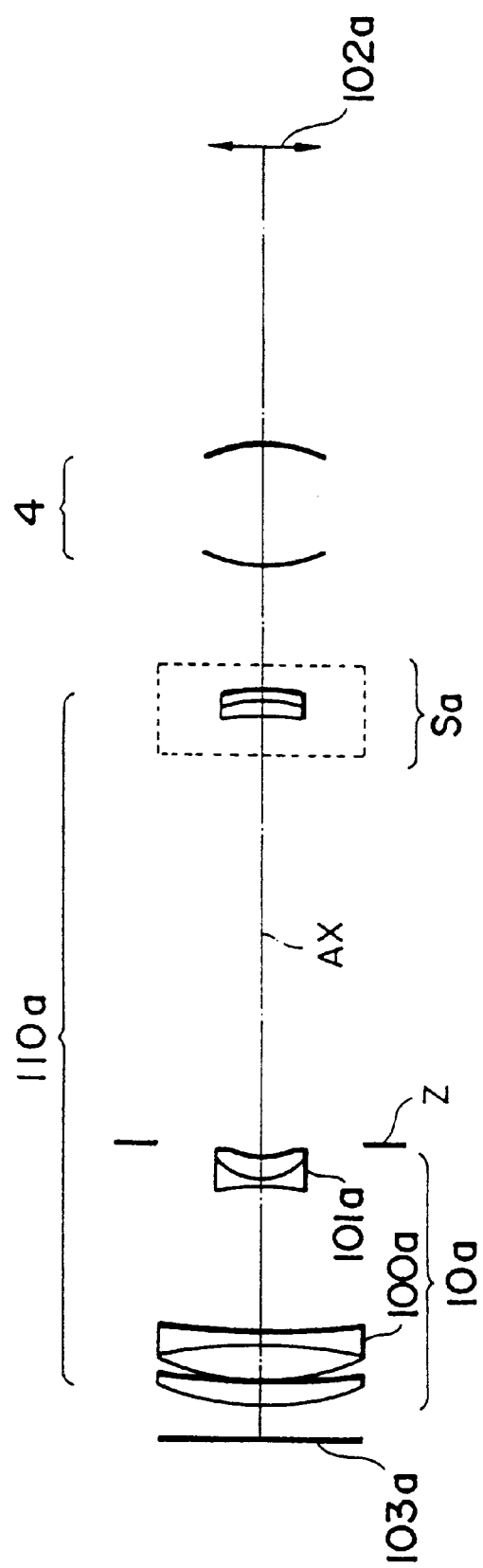
FIG. 6 is a view showing the arrangement of an objective system (first aspect) in the observation apparatus according to the first embodiment of the present invention.

FIG. 6 is a view showing the schematic arrangement of an objective system according to the first embodiment of the present invention. In the first embodiment, a partial objective unit 10a constituting an objective system with a magnitude of 0.5× and an auxiliary lens unit Sa are arranged on an optical axis Ax of the objective system.

In the objective system of FIG. 6, light from a sample (object) 103a is incident on the partial objective unit 10a.

This partial objective unit 10a is constituted by, in the following order from the object side (sample side) to the image side, a first lens unit 100a with a positive refracting power as a whole, and a second lens unit 101a with a negative refracting power as a whole.

This partial objective unit 10a is mounted on a revolver 20 together with a plurality of objective units having different magnifications. Note that the distance along the optical axis Ax between a stage surface 300 placing the sample 103a thereon and the attachment reference plane Z used to mount each objective unit or the partial objective unit 10a on the revolver 20 is a parfocal distance for the objective. Therefore, the partial objective unit 10a attached to the revolver 20 is so designed as to fall within this parfocal distance for the objective.

The light from the sample 103a having passed through the partial objective unit 10a is incident on the auxiliary lens unit (eyepieces) Sa with a positive refracting power as a whole. Note that this auxiliary lens unit Sa is freely inserted/ removed in/from the optical axis Ax, as described above. The auxiliary lens unit Sa is inserted in the optical axis Ax in a 10 manner interlocked with selection of the partial objective unit 10a upon rotation of the revolver 20. The light having passed through the auxiliary lens unit Sa becomes parallel light due to its condensing function and is incident on a tube lens unit 4.

In this manner, the first embodiment constitutes an objective unit 110a (composite focal length: 400 mm) included in the objective system with a magnification of 0.5× by the partial objective unit 10a and the auxiliary lens unit Sa.

As described above, the light from the sample 103a having passed through the objective unit 110a for 0.5× and the tube lens unit 4 forms an observation intermediate image 102a at a magnification of 0.5×. The observation intermediate image 102a is observed with the observer's eye via an eyepiece unit or photographed via the photographing system of, e.g., a camera.

The first embodiment constitutes the objective unit 110a for 0.5× by the partial objective unit 10a (for 0.5×) attached to the revolver 20 and the auxiliary lens unit Sa (for 0.5×) arranged on the optical axis Ax. Therefore, a large composite focal length of the objective unit 110a for 0.5× can be ensured even when the objective unit 10a constituting part of this objective unit 110a is so designed as to fall within the parfocal distance for the objective. As a result, the observation image 102a at 0.5× can be formed via the objective unit 110a for a very low magnification and having a composite focal length of 400 mm and the tube lens unit 4 having a focal length of 200 mm.

As described above, FIG. 6 shows the arrangement of the objective system for allowing observation of the sample 103a at a magnification of 0.5×. However, when the sample 103a is to be observed at a normal magnification, the revolver 20 is rotated to select a predetermined objective unit (e.g., an objective unit 11 for microscopic observation) in accordance with a desired magnification and retract the auxiliary lens unit Sa from the optical axis Ax. In this manner, an observation image at a desired magnification can be formed via a selected predetermined objective unit and the fixed tube lens unit.

The first embodiment allows observation and photography of a sample at respective magnifications ranging from a high magnification to a very low magnification (1.5× or less).

Figure 7:
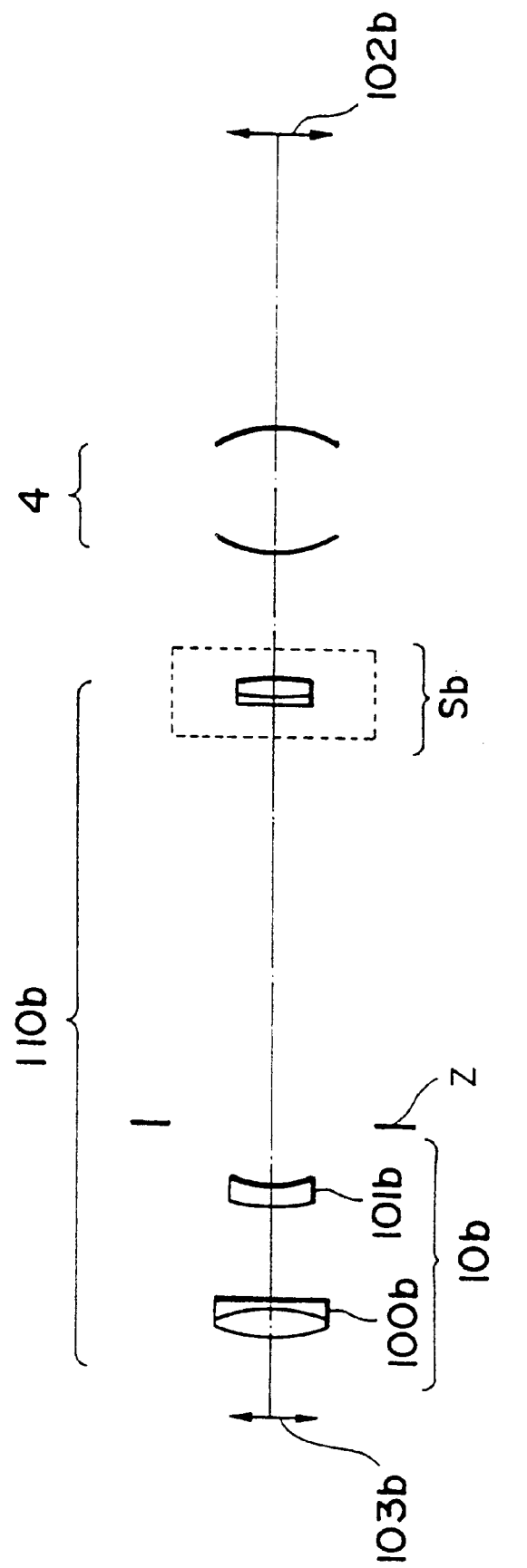
FIG. 7 is a view showing the arrangement of an objective system (first aspect) in the observation apparatus according to the second embodiment of the present invention.

FIG. 7 is a view showing the schematic arrangement of an objective system according to the second embodiment of the present invention.

Note that the second embodiment has an arrangement similar to that of the first embodiment except that the second embodiment constitutes an objective system with a magnification of 1× by arranging a partial objective unit 10b (for 1×) and an auxiliary lens unit Sb (for 1×) on the optical axis Ax, though the first embodiment constitutes the objective system with a magnification of 0.5× by arranging the partial objective unit 10a (for 0.5×) and the auxiliary lens unit Sa (for 0.5×) on the optical axis Ax. Therefore, the same reference numerals in FIG. 7 denote the same constituent elements having the same functions as in the first embodiment of FIG. 6.

The second embodiment also constitutes an objective unit 110b for 1× by the auxiliary lens unit Sb (for 1×) and the partial objective unit 10b constituted by, in the following order from the object side to the image side, a first lens unit 100b with a positive refracting power and a second lens unit 101b with a negative refracting power. Therefore, a large composite focal length of the objective unit 10b can be ensured even when the partial objective unit 10b attached to a revolver 20 is so designed as to fall within the parfocal distance for the objective. As a result, an observation image 102b at 1× can be formed via the objective unit 110b for a very low magnification and having a composite focal length of 200 mm and a tube lens unit 4 having a focal length of 200 mm.

The lens arrangement of the auxiliary lens unit Sa constituting part of the objective unit 110a for 0.5× in the above first embodiment is different from that of the auxiliary lens unit Sb constituting part of the objective unit 110b for 1× in the second embodiment. However, when each auxiliary lens unit having a common arrangement is used regardless of the magnification, the arrangement can be further simplified.

Figure 8:
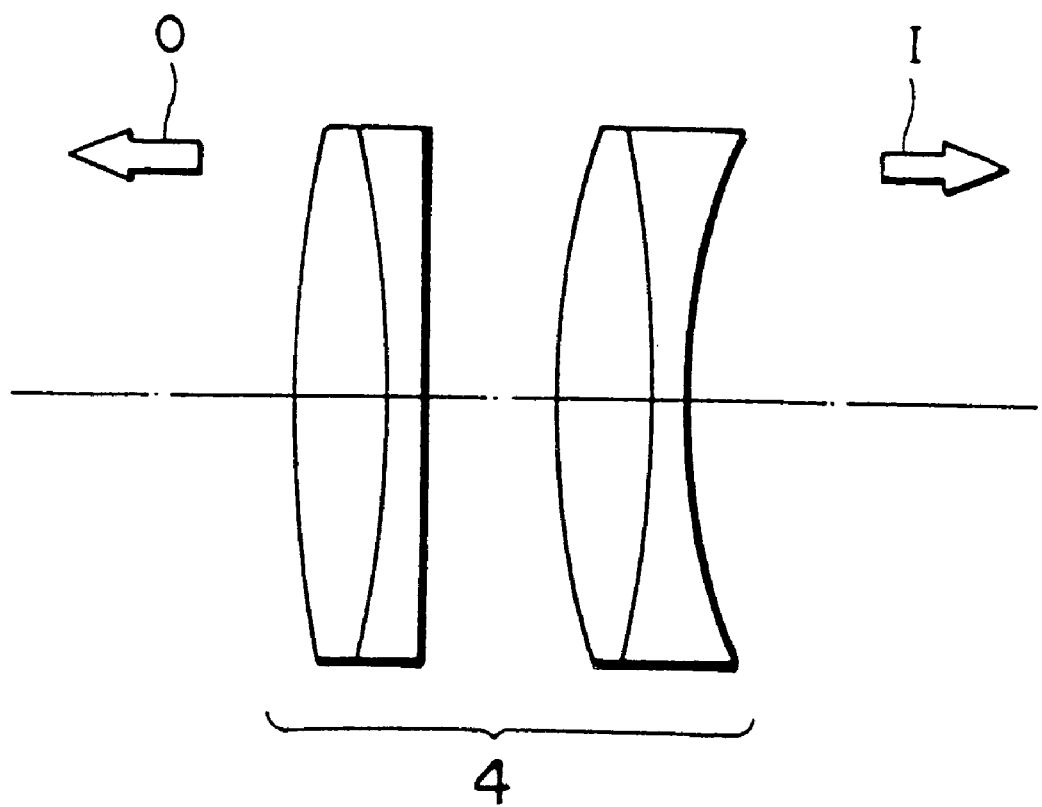
FIG. 8 is a view showing the representative arrangement of the tube lens unit (included in the objective system) in the observation apparatus according to the present invention.

Note that FIG. 8 shows the lens arrangement of the tube lens unit 4, in which an arrow O indicates the object side, and an arrow I indicates the image side.

The present invention comprises a partial objective unit constituting part of the objective unit for a very low magnification, as one of a plurality of first interchangeable objective units attached to the revolver of a microscope. Further, the present invention comprises an auxiliary lens unit which constitutes part of the objective unit for a very low magnification and can be inserted/removed in/from the optical axis between the revolver and the tube lens unit. When a sample is to be observed at a very low magnification, the revolver is rotated to position the partial objective unit for a very low magnification on the optical axis and insert the auxiliary lens unit for a very low magnification in the optical axis.

In this manner, the present invention constitutes the objective unit for a very low magnification by switchable partial objective units attached to a revolver and an auxiliary lens unit which can be set on the optical axis. Therefore, even when the partial objective unit attached to the revolver is designed such that its total length falls within the parfocal distance for the objective, the actual total length of the objective unit includes the length of the auxiliary lens unit and becomes large, and a large composite focal length of the objective unit for a very low magnification can be ensured. As a result, an observation image at a very low magnification of, e.g., 1× or less can be formed via the objective unit for a very low magnification and having a large composite focal length and the tube lens unit.

On the other hand, when a sample is to be observed at not a very low magnification but a normal magnification, the revolver is rotated to select a predetermined objective unit (e.g., the objective unit for microscopic observation) in accordance with a desired magnification and retract the auxiliary lens unit from the optical axis. As a result, an observation image at the desired magnification can be formed via the predetermined objective unit and the tube lens unit.

In this manner, the observation apparatus of the present invention allows observation and photography of a sample at respective magnifications ranging from a high magnification to a very low magnification.

Note that the objective unit for a very low magnification which is constituted by the objective unit attached to the revolver and the auxiliary lens unit is preferably constituted by three units, i.e., in the following order from the object side to the image side, positive, negative, and positive units. The reason is as follows.

In observation at a very low magnification, a beam from the object surface is large in diameter because of a wide field of view. To stop down the large-diameter beam to at least the diameter of the screw of the revolver, a lens unit with a positive refracting power is arranged first. Subsequent negative and positive lens units condense a parallel light beam on the object surface when viewing the objective unit for a very low magnification from the image side. For this reason, the subsequent negative and positive lens units are arranged to be separated from each other when viewed from the image side, thereby obtaining a so-called telephoto type arrangement.

In addition, by interlocking the operation of selecting a partial objective unit used for observation at a very low magnification with the operation of inserting the auxiliary lens unit in the optical axis, this observation apparatus can be operated like a general microscope, resulting in an improvement in operability.

As has been described above, in the observation apparatus of the present invention, the objective unit for a very low magnification is constituted by a partial objective unit attached to a revolver and an auxiliary lens unit. Even when the partial objective unit is so designed as to fall within the parfocal distance for the objective, the actual total length of the objective unit can be made large, and a large composite focal length of the objective unit for a very low magnification can be ensured. Therefore, an observation image at a very low magnification can be formed via the objective unit for a very low magnification and the fixed tube lens unit. As a result, the observation apparatus of the present invention allows observation and photography of a sample at respective magnifications ranging from a high magnification to a very low magnification.

Next, the lens arrangement of the objective unit for a very low magnification will be described with reference to the drawings. FIGS. 9 to 16 are views showing the first to eighth lens arrangements, respectively. Note that the tube lens unit 4 has an arrangement similar to the lens arrangement shown in FIG. 8, and its focal length is 200 mm. FIGS. 17 to 21 show various aberrations in the first lens arrangement of FIG. 9, FIGS. 22 to 26 show various aberrations in the second arrangement of FIG. 10, FIGS. 27 to 31 show various aberrations in the third lens arrangement of FIG. 11, FIGS. 32 to 36 show various aberrations in the fourth lens arrangement of FIG. 12, FIGS. 37 to 41 show various aberrations in the fifth lens arrangement of FIG. 13, FIGS. 42 to 46 show various aberrations in the sixth lens arrangement of FIG. 14, FIGS. 47 to 51 show various aberrations in the seventh lens arrangement of FIG. 15, and FIGS. 52 to 56 show various aberrations in the eighth lens arrangement of FIG. 16.

First and Second Lens Arrangements

Figure 9:
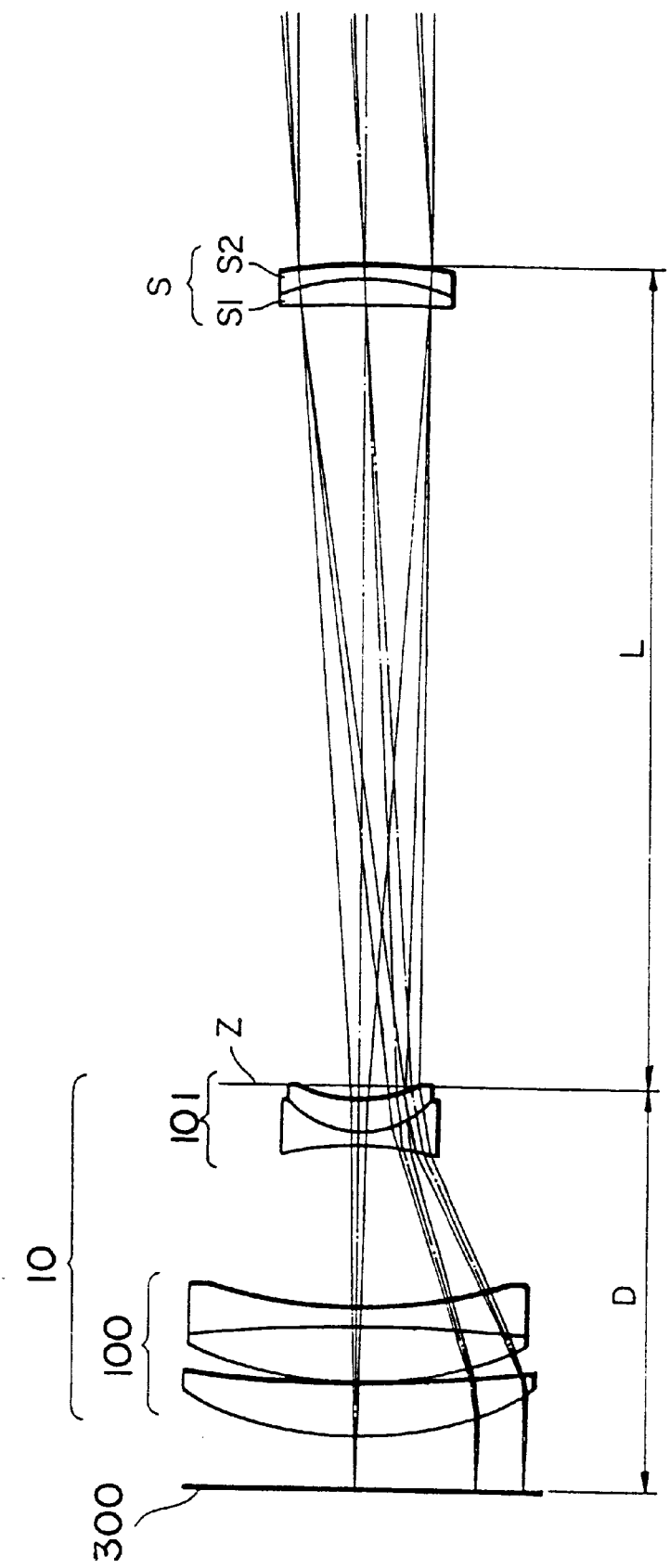
FIG. 9 is a view showing the first lens arrangement of the objective unit for a very low magnification included in the objective system (first aspect) in the observation apparatus according to the present invention.
Figure 10:
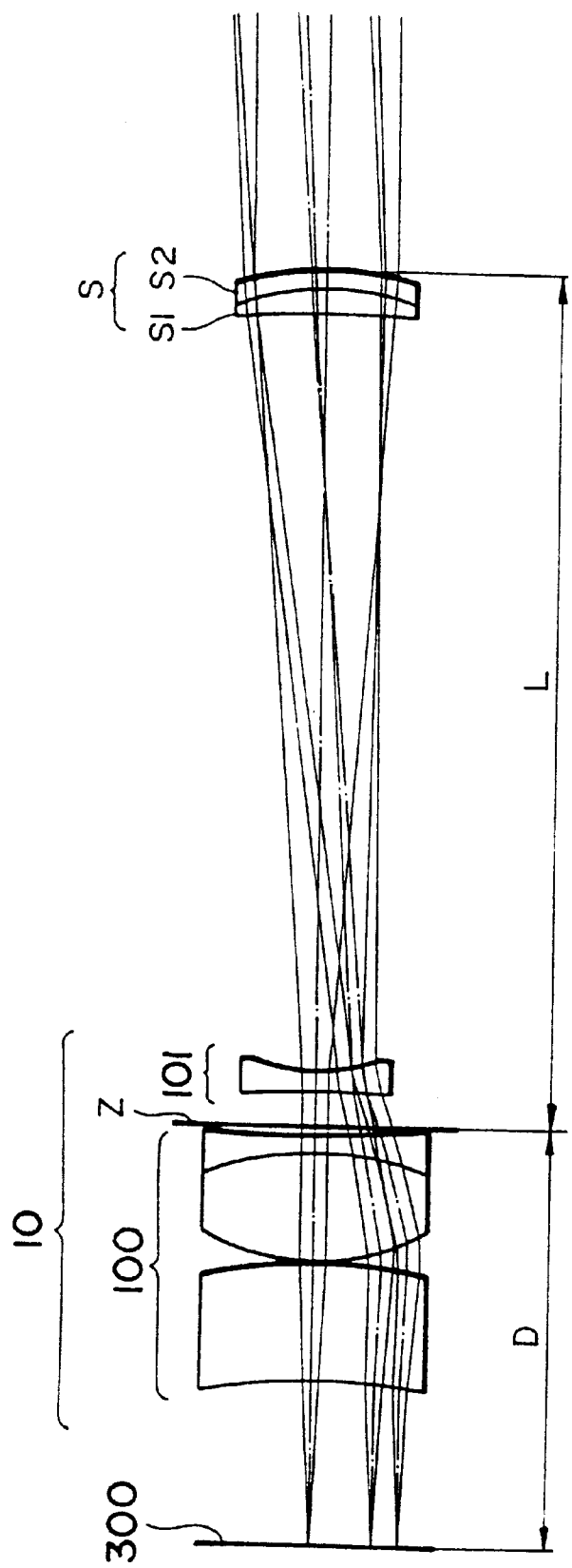
FIG. 10 is a view showing the second lens arrangement of the objective unit for a very low magnification included in the objective system (first aspect) in the observation apparatus according to the present invention.

FIGS. 9 and 10 are views showing the first and second lens arrangements of the partial objective unit 10 (attached to the revolver 20) constituting the objective unit for a very low magnification and the auxiliary lens unit S. Particularly, the partial objective unit shown in FIG. 9 is for a magnification of –0.5×, and the partial objective unit shown in FIG. 10 is for a magnification of –1×.

Each of the partial objective unit shown in FIG. 9 and the partial objective unit shown in FIG. 10 is constituted by, in the following order from the object side (sample surface 300) to the image side, the first lens unit 100 with a positive refracting power and the second lens unit 101 with a negative refracting power. The auxiliary lens unit S with a positive refracting power is arranged on the image side of each partial objective unit.

In the partial objective unit of FIG. 9, the first lens unit 100 is constituted by, in the following order from the object side to the image side, a meniscus positive lens with the convex surface facing the object side, and a cemented lens composed of a biconvex lens and a biconcave lens. The second lens unit 101 is constituted by a cemented lens composed of a biconcave lens with a strong concave surface facing the image side and a meniscus positive lens with the convex surface facing the object side.

In the partial objective unit of FIG. 10, the first lens unit 100 is constituted by, in the following order from the object side to the image side, a meniscus positive lens with the concave surface facing the object side, and a cemented lens composed of a biconvex lens and a biconcave lens. The second lens unit 101 is constituted by a biconcave negative lens with a strong concave surface facing the image side.

The auxiliary lens unit S common to the first and second lens arrangements is constituted by a cemented lens composed of a meniscus positive lens S1 with the convex surface facing the image side and a meniscus negative lens S2 with the convex surface facing the image side.

Tables 1 and 2 show lens data for the partial objective units of the respective lens arrangements and the common auxiliary lens unit. Table 1 shows lens data of the partial objective unit constituting the objective unit (FIG. 9) for a magnification of –0.5× and the auxiliary lens unit. Table 2 shows lens date of the partial objective unit constituting the objective unit (FIG. 10) for a magnification of –1× and the common auxiliary lens unit. In each table, βa is the lateral magnification of an objective system which is a combination of the objective unit (including the partial objective unit attached to the revolver and the auxiliary lens unit) in Table 1 and the tube lens unit shown in FIG. 8; βb is the lateral magnification of an objective system which is a combination of the objective unit (including the partial objective unit attached to the revolver and the auxiliary lens unit) in Table 2 and the tube lens unit shown in FIG. 8; and N.A. is the numerical aperture, on the object side, of the partial objective unit. The real field of view φ is the diameter of the real field of view of the partial objective unit. The entrance pupil distance and the object distance are the distances to the entrance pupil and the object surface, either of which is measured from the first surface (surface on the most object side). The total length is the distance from the sample surface (object surface) to a lens surface, on the most image side, of the auxiliary lens unit S. The parfocal distance for the objective is the distance along the optical axis Ax between the sample surface 300 and the attachment reference plane Z used when the partial objective unit is mounted on the revolver. fa is the composite focal length of the partial objective unit in Table 1 and the auxiliary lens unit; and fb is the composite focal length of the partial objective unit in Table 2 and the auxiliary lens unit. Moreover, in Tables 1 and 2, the number at the most left end represents the surface number, r represents the radii of curvature of the respective lens surfaces, d is the surface-to-surface distance, nd is the refractive index for the d-line, and vd is the refractive index and Abbe number for the d-line. Note that the surface numbers 9 to 11 in Table 1 and the surface numbers 8 to 10 in Table 2 correspond to lens data for the auxiliary lens unit commonly used for the respective objective units having different magnifications in Tables 1 and 2.

TABLE 1

$\beta a = -0.5X$, N.A. = 0.025,
the real field of view $\phi = 50$,
the entrance pupil = $\infty$,
the object distance = 7.8,
the total length = 184,
the parfocal distance for the
objective = 60, and fa = 399.5.

| SURFACE | r | d | nd | vd |
|---|---|---|---|---|
| 1 | 49.754 | 8 | 1.74400 | 45.0 |
| 2 | 239.108 | 0.2 | 1 | |
| 3 | 56.522 | 8.5 | 1.65844 | 50.84 |
| 4 | −230.48 | 3 | 1.68893 | 31.08 |
| 5 | 81.358 | 24 | 1 | |
| 6 | −59.222 | 2 | 1.651599 | 58.5 |
| 7 | 13.936 | 4.6 | 1.804581 | 25.5 |
| 8 | 18.297 | 119.9 | 1 | |
| 9 | −230.781 | 4 | 1.622801 | 57.03 |
| 10 | −31.106 | 2 | 1.749501 | 35.19 |
| 11 | −54.724 | | | |

TABLE 2

$\beta b = -1X$, N.A. = 0.05,
The real field of view $\phi = 25$,
the entrance pupil = $\infty$,
the object distance = 23.2, the
total length = 184,
the parfocal distance for the
objective = 60, and fb = 201.3.

| SURFACE | r | d | nd | vd |
|---|---|---|---|---|
| 1 | −99.025 | 17 | 1.787971 | 47.47 |
| 2 | −63.626 | 0.2 | 1 | |
| 3 | 29.009 | 16 | 1.65844 | 50.84 |
| 4 | −41.406 | 2.5 | 1.749501 | 35.19 |
| 5 | 307.446 | 6.3 | 1 | |
| 6 | −148. 037 | 2.4 | 1.651599 | 58.5 |
| 7 | 20.35 | 110.4 | 1 | |
| 8 | −230.781 | 4 | 1.622801 | 57.03 |
| 9 | −31.106 | 2 | 1.749501 | 35.19 |
| 10 | −54.724 | | | |

Third and Fourth Lens Arrangements

Figure 11:
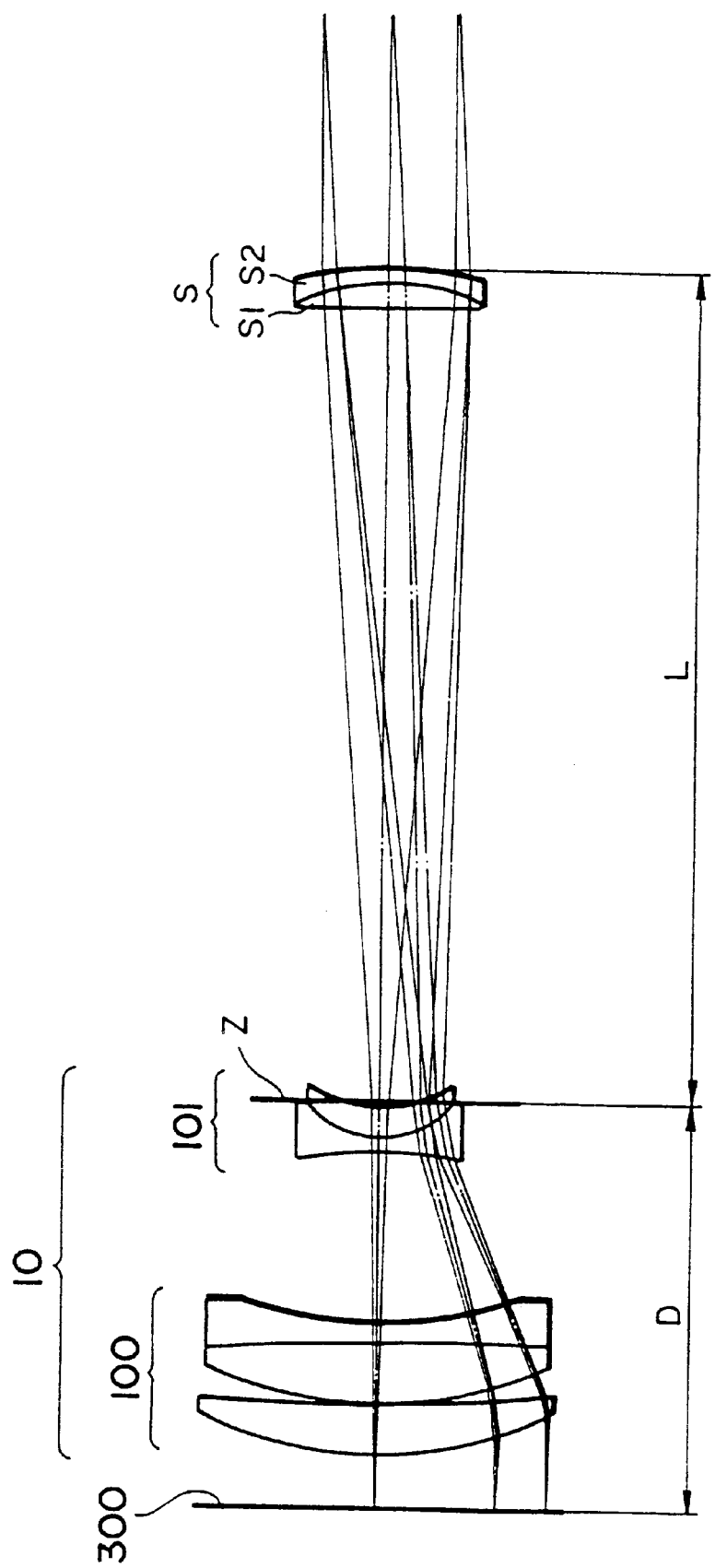
FIG. 11 is a view showing the third lens arrangement of the objective unit for a very low magnification included in the objective system (first aspect) in the observation apparatus according to the present invention.
Figure 12:
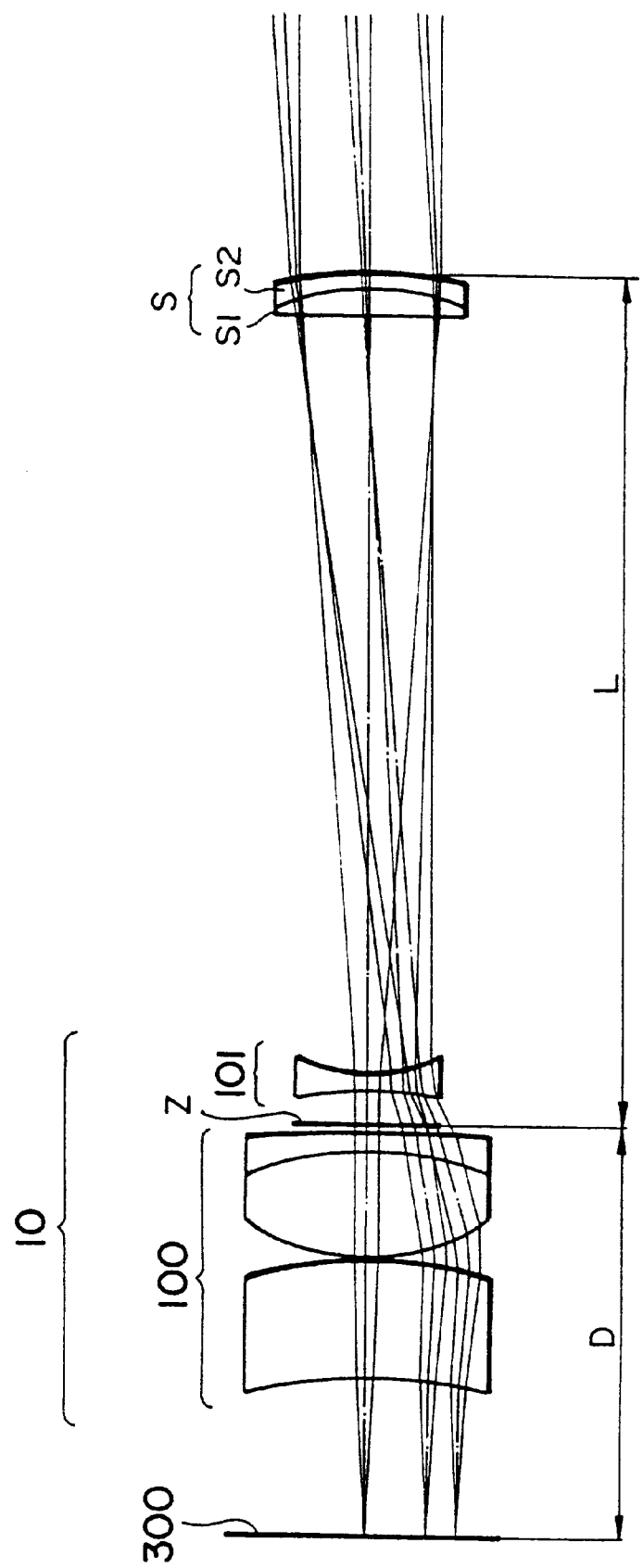
FIG. 12 is a view showing the fourth lens arrangement of the objective unit for a very low magnification included in the objective system (first aspect) in the observation apparatus according to the present invention.

FIGS. 11 and 12 are views showing the third and fourth lens arrangements of the partial objective unit 10 (attached to the revolver 20) constituting the objective unit for a very low magnification and the auxiliary lens unit S. Particularly, the partial objective unit shown in FIG. 11 is for a magnification of −0.5×, and the partial objective unit shown in FIG. 12 is for a magnification of −1×.

Each of the partial objective unit shown in FIG. 11 and the partial objective unit shown in FIG. 12 is constituted by, in the following order from the object side (sample surface 300) to the image side, the first lens unit 100 with a positive refracting power and the second lens unit 101 with a negative refracting power. The auxiliary lens unit S with a positive refracting power is arranged on the image side of each partial objective unit.

In the partial objective unit of FIG. 11, the first lens unit 100 is constituted by, in the following order from the object side to the image side, a meniscus positive lens with the convex surface facing the object side, and a cemented lens composed of a biconvex lens and a biconcave lens. The second lens unit 101 is constituted by a cemented lens composed of a biconcave lens with a strong concave surface facing the image side and a meniscus positive lens with the convex surface facing the object side.

In the partial objective unit of FIG. 12, the first lens unit 100 is constituted by, in the following order from the object side to the image side, a meniscus positive lens with the concave surface facing the object side, and a cemented lens composed of a biconvex lens and a meniscus negative lens with the concave surface facing the object side. The second lens unit 101 is constituted by a biconcave negative lens with a strong concave surface facing the image side.

The auxiliary lens unit S common to the third and fourth lens arrangements is constituted by a cemented lens composed of a meniscus positive lens SI with the convex surface facing the image side and a meniscus negative lens S2 with the convex surface facing the image side.

Tables 3 and 4 show lens data for the partial objective units of the respective lens arrangements and the common auxiliary lens unit. Table 3 shows lens data of the partial objective unit constituting the objective unit (FIG. 11) for a magnification of −0.5× and the auxiliary lens unit. Table 4 shows lens date of the partial objective unit constituting the objective unit (FIG. 12) for a magnification of −1× and the common auxiliary lens unit. In each table, $\beta a$ is the lateral magnification of an objective system which is a combination of the objective unit (including the partial objective unit attached to the revolver and the auxiliary lens unit) in Table 3 and the tube lens unit shown in FIG. 8; $\beta b$ is the lateral magnification of an objective system which is a combination of the objective unit (including the partial objective unit attached to the revolver and the auxiliary lens unit) in Table 4 and the tube lens unit shown in FIG. 8; and N.A. is the numerical aperture, on the object side, of the partial objective unit. The real field of view $\phi$ is the diameter of the real field of view of the partial objective unit. The entrance pupil distance and the object distance are the distances to the entrance pupil and the object surface, either of which is measured from the first surface (surface on the most object side). The total length is the distance from the sample surface (object surface) to a lens surface, on the most image side, of the auxiliary lens unit S. The parfocal distance for the objective is the distance along the optical axis Ax between the sample surface 300 and the attachment reference plane Z used when the partial objective unit is mounted on the revolver 20. Note that fa is the composite focal length of the partial objective unit in Table 3 and the auxiliary lens unit; and fb is the composite focal length of the partial objective unit in Table 4 and the auxiliary lens unit. Moreover, in Tables 3 and 4, the number at the most left end represents the surface number, r represents the radii of curvature of the respective lens surfaces, d is the surface-to-surface distance, nd is the refractive index for the d-line, and vd is the refractive index and Abbe number for the d-line. Note that the surface numbers 9 to 11 in Table 3 and the surface numbers 8 to 10 in Table 4 correspond to lens data for the auxiliary lens unit commonly used for the respective objective units having different magnifications in Tables 3 and 4.

TABLE 3

βa = −0.5X, N.A. = 0.025,
the real field of view φ = 50,
the entrance pupil = ∞,
the object distance = 7.8,
the total length = 184,
the parfocal distance for the
objective = 60, and fa = 392.7.

| SURFACE | r | d | nd | vd |
|---|---|---|---|---|
| 1 | 55.364 | 7.5 | 1.796681 | 45.37 |
| 2 | 299.253 | 0.2 | 1 | |
| 3 | 58.487 | 9 | 1.787971 | 47.47 |
| 4 | −1000.58 | 3 | 1.756920 | 31.62 |
| 5 | 63.39 | 25.1 | 1 | |
| 6 | −74.523 | 2 | 1.651599 | 58.5 |
| 7 | 13.54 | 4.6 | 1.804581 | 25.5 |
| 8 | 18.3 | 118.8 | 1 | |
| 9 | −280.994 | 4 | 1.61720 | 54.01 |
| 10 | −32.369 | 2 | 1.75692 | 31.62 |
| 11 | −56.067 | | | |

TABLE 4

βb = −1X, N.A. = 0.05,
the real field of view φ = 25,
the entrance pupil = ∞,
the object distance = 23.2, the
total length = 184, the parfocal distance for the
objective = 60, and fb = 204.3.

| SURFACE | r | d | nd | vd |
|---|---|---|---|---|
| 1 | −71.514 | 17 | 1.796681 | 45.37 |
| 2 | −55.691 | 0.2 | 1 | |
| 3 | 28.108 | 16 | 1.60311 | 60.65 |
| 4 | −42.967 | 2.5 | 1.671629 | 38.8 |
| 5 | −213.923 | 6.3 | 1 | |
| 6 | −54.121 | 2.4 | 1.651599 | 58.5 |
| 7 | 21.196 | 110.4 | 1 | |
| 8 | −280.994 | 4 | 1.617200 | 54.01 |
| 9 | −32.369 | 2 | 1.756920 | 31.62 |
| 10 | −56.067 | | | |

Fifth and Sixth Lens Arrangements

Figure 13:
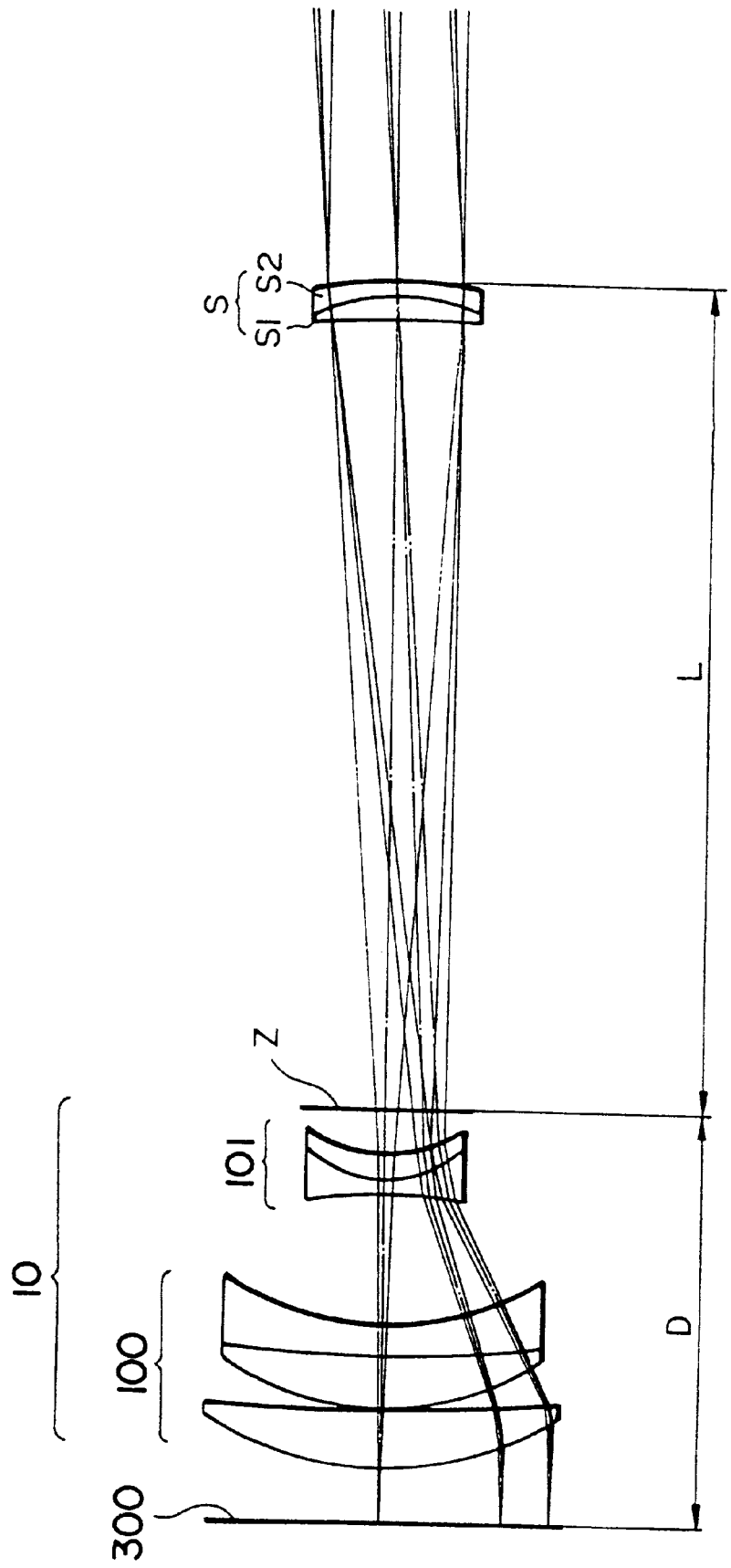
FIG. 13 is a view showing the fifth lens arrangement of the objective unit for a very low magnification included in the objective system (first aspect) in the observation apparatus according to the present invention.
Figure 14:
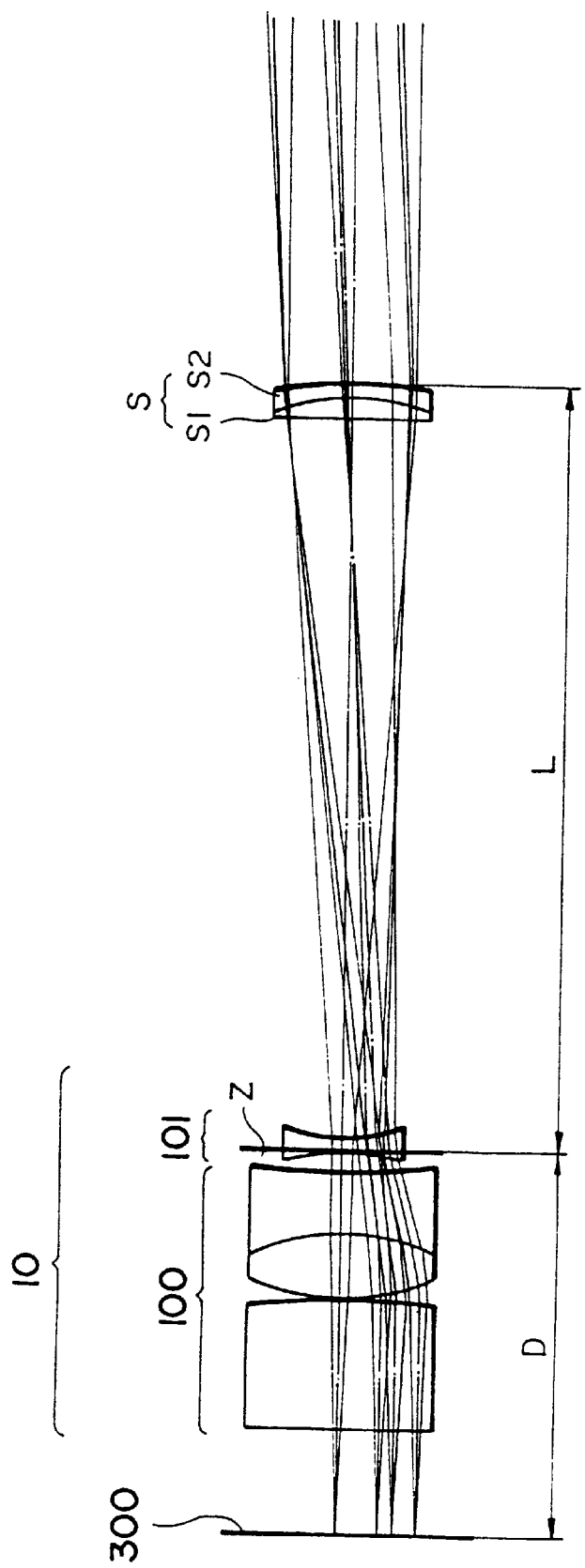
FIG. 14 is a view showing the sixth lens arrangement of the objective unit for a very low magnification included in the objective system (first aspect) in the observation apparatus according to the present invention.

FIGS. 13 and 14 are views showing the lens arrangements of the partial objective unit 10 (attached to the revolver 20) constituting the objective unit for a very low magnification and the auxiliary lens unit S. Particularly, the partial objective unit shown in FIG. 13 is for a magnification of −0.5×, and the partial objective unit shown in FIG. 14 is for a magnification of −1×.

Each of the partial objective unit shown in FIG. 13 and the partial objective unit shown in FIG. 14 is constituted by, in the following order from the object side (sample surface 300) to the image side, the first lens unit 100 with a positive refracting power and the second lens unit 101 with a negative refracting power. The auxiliary lens unit S with a positive refracting power is arranged on the image side of each partial objective unit.

In the partial objective unit of FIG. 13, the first lens unit 100 is constituted by, in the following order from the object side to the image side, a meniscus positive lens with the convex surface facing the object side, and a cemented lens composed of a meniscus positive lens with the convex surface facing the object side and a meniscus negative lens with the convex surface facing the object side. The second lens unit 101 is constituted by a cemented lens composed of a biconcave lens with a strong concave surface facing the image side and a meniscus positive lens with the convex surface facing the object side.

In the partial objective unit of FIG. 14, the first lens unit 100 is constituted by, in the following order from the object side to the image side, a plano-convex lens with the convex surface facing the object side, and a cemented lens composed of a meniscus positive lens with the convex surface facing the object side and a meniscus negative lens with the convex surface facing the object side. The second lens unit 101 is constituted by a biconcave negative lens with a strong concave surface facing the image side.

The auxiliary lens unit S common to the fifth and sixth lens arrangements is constituted by a cemented lens composed of a meniscus positive lens S1 with the convex surface facing the image side and a meniscus negative lens S2 with the convex surface facing the image side.

Tables 5 and 6 show lens data for the partial objective units of the respective lens arrangements and the common auxiliary lens unit. Table 5 shows lens data of the partial objective unit constituting the objective unit (FIG. 13) for a magnification of −0.5× and the auxiliary lens unit. Table 6 shows lens date of the partial objective unit constituting the objective unit (FIG. 14) for a magnification of −1× and the auxiliary lens unit. In each table, βa is the lateral magnification of an objective system which is a combination of the objective unit (including the partial objective unit attached to the revolver and the auxiliary lens unit) in Table 5 and the tube lens unit shown in FIG. 8; βb is the lateral magnification of an objective system which is a combination of the objective unit (including the partial objective unit attached to the revolver and the and the auxiliary lens unit) in Table 6 and the tube lens unit shown in FIG. 8; and N.A. is the numerical aperture, on the object side, of the partial objective unit. The real field of view φ is the diameter of the real field of view of the partial objective unit. The entrance pupil distance and the object distance are the distances to the entrance pupil and the object surface, either of which is measured from the first surface (surface on the most object side). The total length is the distance from the sample surface (object surface) to a lens surface, on the most image side, of the auxiliary lens unit S. The parfocal distance for the objective is the distance along the optical axis between the sample surface 300 and the attachment reference plane Z used when the partial objective unit is mounted on the revolver. fa is the composite focal length of the partial objective unit in Table 5 and the auxiliary lens unit; and fb is the composite focal length of the partial objective unit in Table 6 and the auxiliary lens unit. Moreover, in Tables 5 and 6, the number at the most left end represents the surface number, r represents the radii of curvature of the respective lens surfaces, d is the surface-to-surface distance, nd is the refractive index for the d-line, and vd is the refractive index and Abbe number for the d-line. Note that the surface numbers 9 to 11 in Table 5 and the surface numbers 8 to 10 in Table 6 correspond to lens data for the auxiliary lens unit commonly used for the respective objective units having different magnifications in Tables 5 and 6.

TABLE 5

βa = −0.5X, N.A. = 0.025,
the real field of view φ = 50,
the entrance pupil = ∞,
the object distance = 7.8,
the total length = 181.5,
the parfocal distance for the
objective = 60, and fa = 397.4.

| SURFACE | r | d | nd | vd |
|---|---|---|---|---|
| 1 | 47.761 | 8.5 | 1.787971 | 47.47 |
| 2 | 478.836 | 0.2 | 1 | |
| 3 | 40.27 | 7.5 | 1.648311 | 33.75 |
| 4 | 200.049 | 4 | 1.748099 | 52.30 |
| 5 | 41.174 | 19.2 | 1 | |
| 6 | −87.496 | 2 | 1.748099 | 52.3 |
| 7 | 14.4 | 4 | 1.804581 | 25.5 |
| 8 | 19.597 | 122.8 | 1 | |
| 9 | −244.67 | 3.5 | 1.658440 | 50.84 |
| 10 | −31.533 | 2 | 1.756920 | 31.62 |
| 11 | −59.519 | | | |

TABLE 6

βb = −1X, N.A. = 0.05,
the real field of view φ = 25,
the entrance pupil = ∞,
the object distance = 17.2, the
total length = 181.5,
the parfocal distance for the
objective = 60, and fb = 202.7.

| SURFACE | r | d | nd | vd |
|---|---|---|---|---|
| 1 | ∞ | 20 | 1.748099 | 52.3 |
| 2 | −142.75 | 0.5 | 1 | |
| 3 | 39.434 | 10 | 1.787971 | 47.47 |
| 4 | −31.5 | 9 | 1.625882 | 35.7 |
| 5 | 119.327 | 2.9 | 1 | |
| 6 | −48.611 | 2.4 | 1.516800 | 64.1 |
| 7 | 21 | 114 | 1 | |
| 8 | −244.67 | 3.5 | 1.658440 | 50.84 |
| 9 | −31.533 | 2 | 1.756920 | 31.62 |
| 10 | −59.519 | | | |

Seventh and Eighth Lens Arrangements

Figure 15:
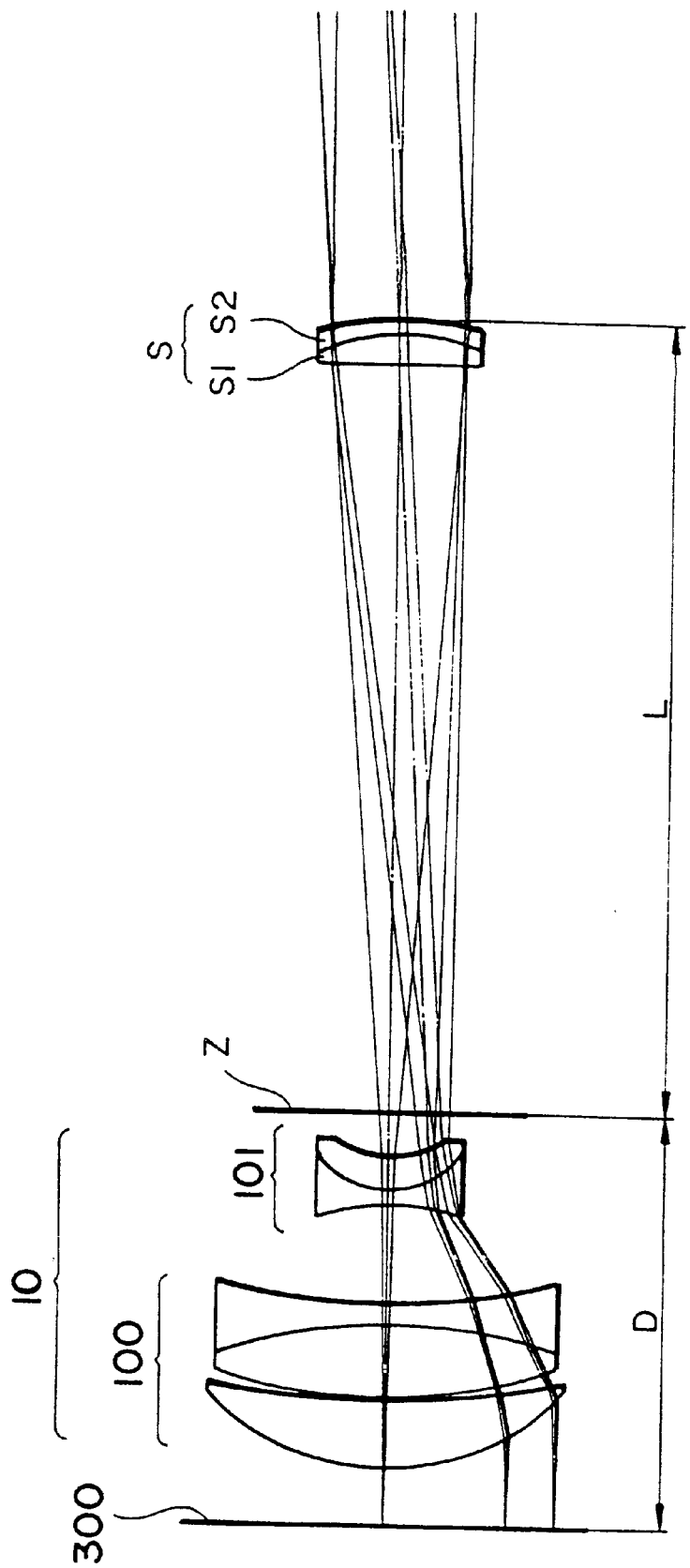
FIG. 15 is a view showing the seventh lens arrangement of the objective unit for a very low magnification included in the objective system (first aspect) in the observation apparatus according to the present invention.
Figure 16:
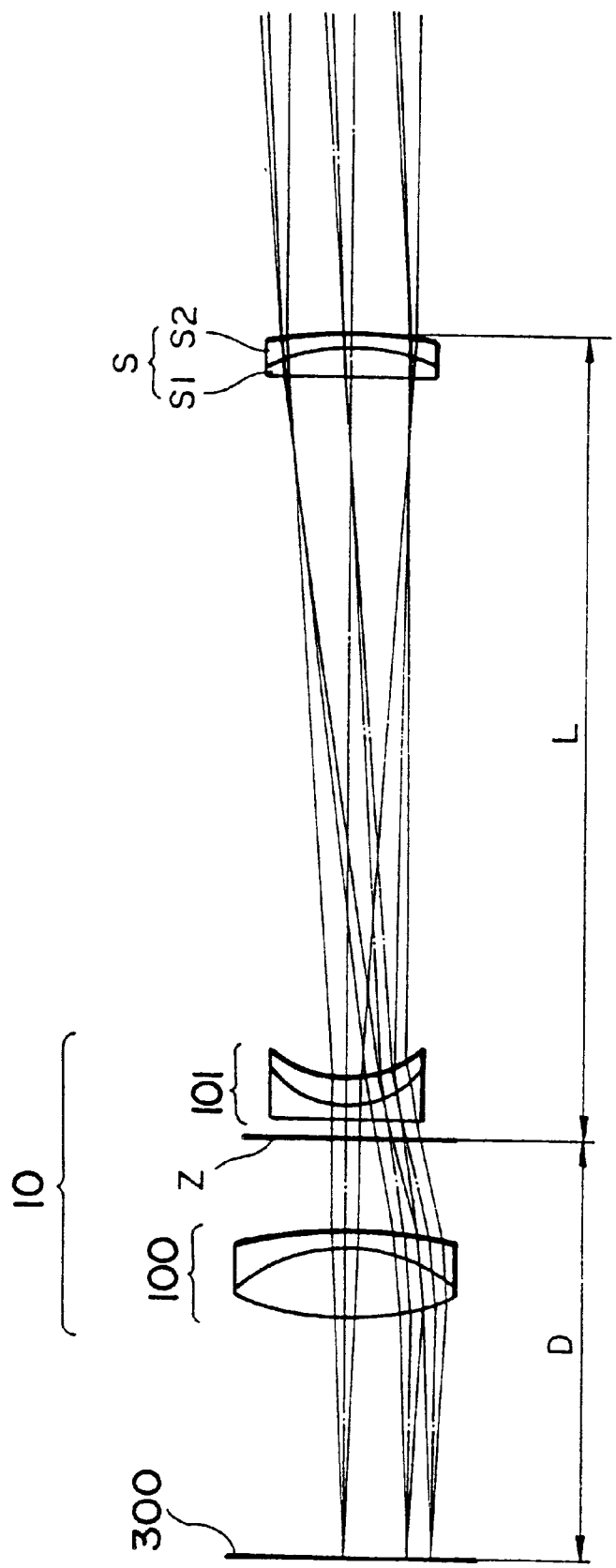
FIG. 16 is a view showing the eighth lens arrangement of the objective unit for a very low magnification included in the objective system (first aspect) in the observation apparatus according to the present invention.
Figures 17, 18, 19, 20, 21:
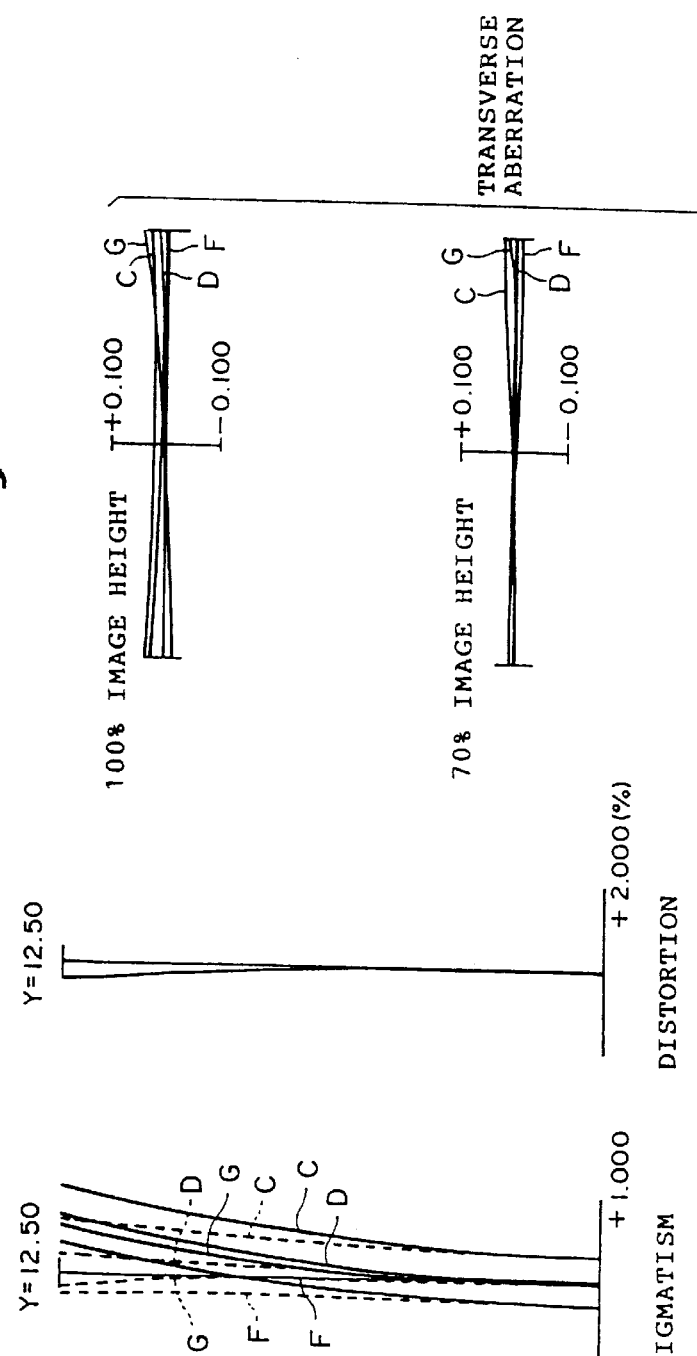
Figures 32, 33, 34:
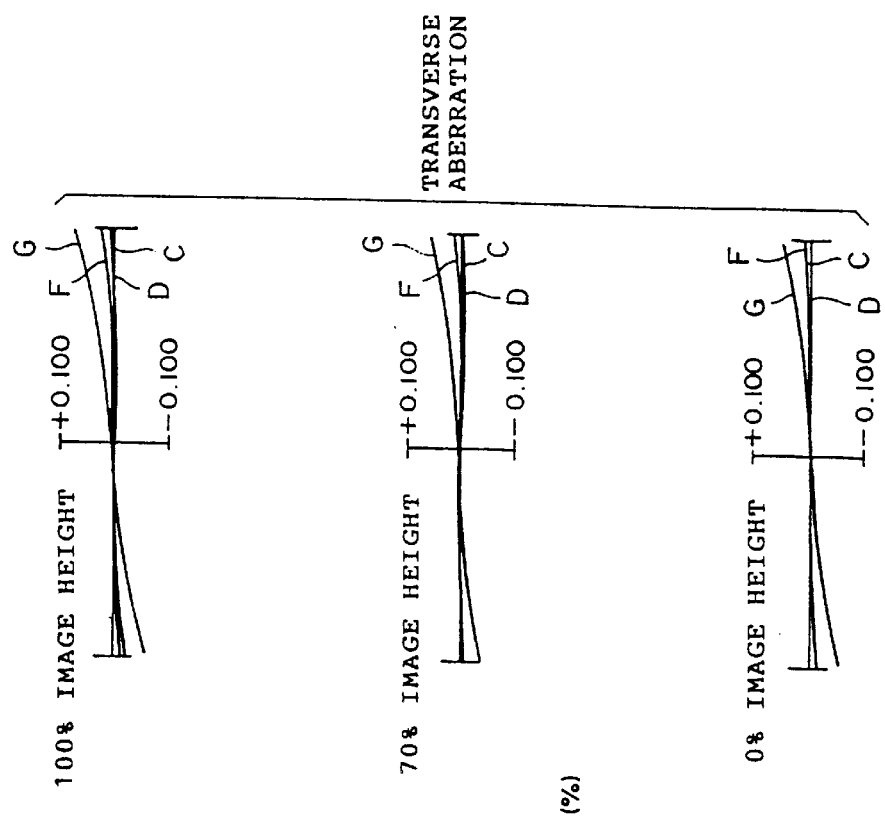
Figure 35:
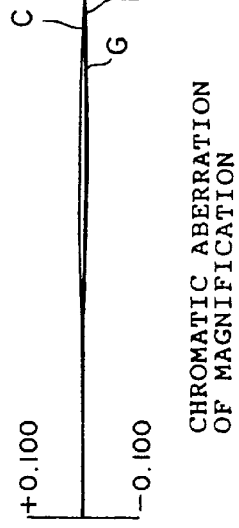
Figure 36:
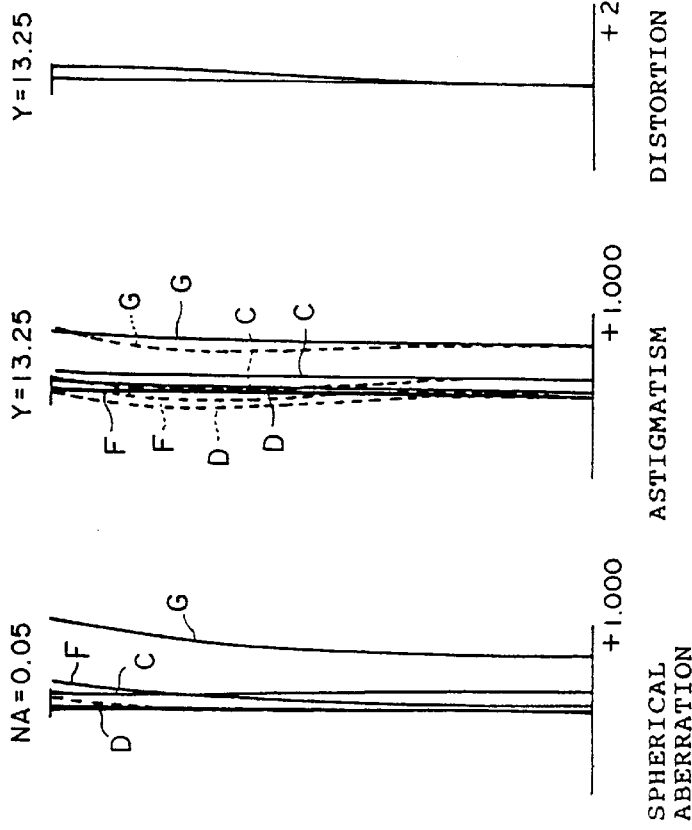

FIGS. 15 and 16 are views showing the seventh and eighth lens arrangements of the partial objective unit 10 (attached to the revolver 20) constituting the objective unit for a very low magnification and the common auxiliary lens unit S. Particularly, the partial objective unit shown in FIG. 15 is for a magnification of −0.5×, and the partial objective unit shown in FIG. 16 is for a magnification of −1×.

Each of the partial objective unit shown in FIG. 15 and the partial objective unit shown in FIG. 16 is constituted by, in the following order from the object side (sample surface 300) to the image side, the first lens unit 100 with a positive refracting power and the second lens unit 101 with a negative refracting power. The auxiliary lens unit S with a positive refracting power is arranged on the image side of each partial objective unit.

In the partial objective unit of FIG. 15, the first lens unit 100 is constituted by, in the following order from the object side to the image side, a meniscus positive lens with the convex surface facing the object side, and a cemented lens composed of a biconvex lens and a biconcave lens. The second lens unit 101 is constituted by a cemented lens composed of a biconcave lens with a strong concave surface facing the image side and a meniscus positive lens with the convex surface facing the object side.

In the partial objective unit of FIG. 16, the first lens unit 100 is constituted by, in the following order from the object side to the image side, a cemented lens composed of a biconvex lens and a meniscus negative lens with the concave surface facing the object side. The second lens unit 101 is constituted by a biconcave lens with a strong concave surface facing the image side and a meniscus positive lens with the convex surface facing the object side.

The auxiliary lens unit S common to the seventh and eighth lens arrangements is constituted by a cemented lens composed of a meniscus positive lens S1 with the convex surface facing the image side and a meniscus negative lens S2 with the convex surface facing the image side.

Tables 7 and 8 show lens data for the partial objective units of the respective lens arrangements and the auxiliary lens unit. Table 7 shows lens data for the partial objective unit constituting the objective unit (FIG. 15) for a magnification of −0.5× and the auxiliary lens unit. Table 8 shows lens date for the partial objective unit constituting the objective unit (FIG. 16) for a magnification of −1× and the common auxiliary lens unit. In each table, βa is the lateral magnification of an objective system which is a combination of the objective unit (including the partial objective unit attached to the revolver and the auxiliary lens unit) in Table 7 and the tube lens unit shown in FIG. 8; βb is the lateral magnification of an objective system which is a combination of the objective unit (including the partial objective unit attached to the revolver and the auxiliary lens unit) in Table 8 and the tube lens unit shown in FIG. 8; and N.A. is the numerical aperture, on the object side, of the partial objective unit. The real field of view φ is the diameter of the real field of view of the partial objective unit. The entrance pupil distance and the object distance are the distances to the entrance pupil and the object surface, either of which is measured from the first surface (surface on the most object side). The total length is the distance from the sample surface (object surface) to a lens surface, on the most image side, of the auxiliary lens unit S. The parfocal distance for the objective is the distance along the optical axis between the sample surface 300 and the attachment reference plane Z used when the partial objective unit is mounted on the revolver. fa is the composite focal length of the partial objective unit in Table 7 and the auxiliary lens unit; and fb is the composite focal length of the partial objective unit in Table 8 and the auxiliary lens unit. Moreover, in Tables 7 and 8, the number at the most left end represents the surface number, r represents the radii of curvature of the respective lens surfaces, d is the surface-to-surface distance, nd is the refractive index for the d-line, and vd is the refractive index and Abbe number for the d-line. Note that the surface numbers 9 to 11 in Table 7 and the surface numbers 8 to 10 in Table 8 correspond to lens data for the auxiliary lens unit commonly used for the respective objective units having different magnifications in Tables 7 and 8.

TABLE 7

βa = −0.5X, N.A. = 0.025,
the real field of view φ = 50,
the entrance pupil = ∞,
the object distance = 7.8,
the total length = 176,
the parfocal distance for the
objective = 60, and fa = 400.

| SURFACE | r | d | nd | vd |
|---|---|---|---|---|
| 1 | 35.286 | 10 | 1.787971 | 47.47 |
| 2 | 152.875 | 0.2 | 1 | |
| 3 | 70.552 | 10.5 | 1.620409 | 60.14 |
| 4 | −83.348 | 3 | 1.755200 | 27. 61 |

TABLE 7-continued $\beta a = -0.5X$, N.A. = 0.025,
the real field of view $\phi = 50$,
the entrance pupil = ∞,
the object distance = 7.8,
the total length = 176,
the parfocal distance for the
objective = 60, and fa = 400.

| SURFACE | r | d | nd | vd |
|---|---|---|---|---|
| 5 | 109.113 | 14.8 | 1 | |
| 6 | −32.066 | 2 | 1.620409 | 60.14 |
| 7 | 12.504 | 4.6 | 1.804581 | 25.5 |
| 8 | 15.986 | 117.1 | 1 | |
| 9 | −212.087 | 4 | 1.622801 | 57.03 |
| 10 | −29.568 | 2 | 1.749501 | 35.19 |
| 11 | −52.013 | | | |

TABLE 8

$\beta b = -1X$, N.A. = 0.04,
the real field of view $\phi = 25$,
the entrance pupil = ∞,
the object distance = 34.1, the
total length = 176,
the parfocal distance for the
objective = 60, and fb = 200.1.

| SURFACE | r | d | nd | vd |
|---|---|---|---|---|
| 1 | 43.063 | 10 | 1.620409 | 60.14 |
| 2 | −23.25 | 2 | 1.749501 | 35.19 |
| 3 | −67.373 | 16.5 | 1 | |
| 4 | −824.161 | 2 | 1.526820 | 51.35 |
| 5 | 12.198 | 4 | 1.784721 | 25.8 |
| 6 | 15.881 | 101.4 | 1 | |
| 7 | −212.087 | 4 | 1.622801 | 57.03 |
| 8 | −29.568 | 2 | 1.749501 | 35.19 |
| 9 | −52.013 | | | |

Note that some of the above-described lens arrangements have the second lens units 101 each of which is positioned nearer to the image side than the attachment reference plane Z. As shown in FIGS. 1 and 4, the external thread is formed on the lens barrel for holding these first and second lens units 100 and 101 nearer the image side than the attachment reference plane Z of the lens barrel. Part of the lens barrel with this external thread formed thereon is buried in the revolver 20. With this structure, the second lens unit 101 positioned nearer to the image side than the attachment reference plane Z can be accommodated in this buried portion of the lens barrel, and no problem arises.

Table 9 shows the condition corresponding values of the respective lens arrangements.

TABLE 9

| | | EX. 1 | EX. 2 | EX. 3 | EX. 4 |
|---|---|---|---|---|---|
| (1) | (D + L)/fS | 1.3 | 1.31 | 1.28 | 1.3 |
| (2) | L | 124 | 124 | 121.5 | 116 |
| (3) | \|υ1S−υ2S\| | 21.84 | 22.39 | 19.22 | 21.84 |
| (4) | \|βa\| | 0.5 | 0.5 | 0.5 | 0.5 |
| (5) | f1a/fa | 0.15 | 0.17 | 0.15 | 0.13 |
| (6) | \|βb\|/\|βa\| | 2.0 | 2.0 | 2.0 | 2.0 |
| (7) | f1b/fb | 0.19 | 0.17 | 0.19 | 0.26 |
| (8) | (t1b + t2b)/D | 0.63 | 0.63 | 0.69 | 0.3 |
| (9) | \|βb\| | 1.0 | 1.0 | 1.0 | 1.0 |

FIGS. 17 to 56 are graphs showing various aberrations corresponding to the respective lens arrangements (FIGS. 9 to 16). Each graph shows the aberrations of the entire objective system prepared by combining the partial objective unit having a corresponding lens arrangement and the auxiliary lens unit with the tube lens unit. The tube lens unit used to obtain these graphs has the lens arrangement shown in FIG. 8, and its lens data will be shown in Table 10. In Table 10, the number at the most left end represents the surface number, r represents the radii of curvature of the respective lens surfaces, d is the surface-to-surface distance, nd is the refractive index for the d-line, and vd is the refractive index and Abbe number for the d-line.

TABLE 10

| SURFACE | r | d | nd | vd |
|---|---|---|---|---|
| 1 | 75.043 | 5.1 | 1.622801 | 57.033 |
| 2 | −75.043 | 2 | 1.749501 | 35.19 |
| 3 | 1600.58 | 7.5 | 1 | |
| 4 | 50.256 | 5.1 | 1.667551 | 41.96 |
| 5 | −84.541 | 1.8 | 1.612658 | 44.41 |
| 6 | 36.911 | | | |

In each of Tables 1–8 and 10, the unit of measurement of the real field of view Φ, the entrance distance, the object distance, the total length, the parfocal distance for the objective, the focal lengths fa and fb, and the surface-to-surface distance is "mm. "Of the above-described graphs for various aberrations, FIGS. 17, 22, 27, 32, 37, 42, 47, and 52 show spherical aberrations, FIGS. 18, 23, 28, 33, 38, 43, 48, an 53 show astigmatisms, FIGS. 19, 24, 29, 34, 39, 44, 49, and 54 show distortions, FIGS. 20, 25, 30, 35, 40, 45, 50, and 55 show the chromatic aberrations of magnifications, and FIGS. 21, 26, 31, 36, 41, 46, 51, and 56 show transverse aberrations. In each graph, NA is the numerical aperture on the image side, Y is the image height, D is the d-line (587.6 nm), F is the F-line (486.1 nm), C is the C-line (656.3 nm), and G is the g-line (435.8 nm). In each graph showing the spherical aberration, a broken line represents the sine condition violation amount. In each graph showing the astigmatism, a solid line represents the sagittal image plane, and a broken line represents the meridional image plane. Particularly, each graph of the transverse aberration shows transverse aberrations for 100% and 70% image heights and on the axis (0% image height).

As is apparent from these graphs of various aberrations, it was found that various aberrations were satisfactorily corrected in the respective lens arrangements though these lens arrangements used the common auxiliary lens unit.

As has been described above, the observation apparatus according to the present invention allows observation and photography of a sample at a plurality of magnifications in a very low magnification range.

Additionally, though the auxiliary lens unit S is constituted by one cemented lens having a positive refracting power as a whole in each of the above embodiments, it is not limited by the arrangement. In stead of the cemented lens, the auxiliary lens unit S may be constituted by various arrangements such as a combination of a positive lens and a negative lens not comprising a cemented lens, three or more lens elements, or the like.

According to the present invention, a partial objective unit (attachable to a revolver) constituting part of an objective unit for a very low magnification can advantageously commonly use one type of auxiliary lens unit to constitute the objective unit included in an objective system with a plurality of magnifications. In addition, this observation apparatus advantageously allows observation of an image in a wide field of view in which aberrations are satisfactorily corrected.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

What is claimed is:

1. An observation apparatus having an objective system with an interchangeable objective unit and a tube lens unit set at a position to which a light beam is guided from said objective unit, thereby forming an observation image of an object at a predetermined magnification via said objective and tube lens units, comprising:

a stage capable of allowing said object to be held on a major surface thereof;

a revolver to which a partial objective unit constituting part of said objective unit can be attached, said revolver setting said partial objective unit attached to said revolver at a first position on an optical axis of said objective system between said stage and said revolver;

an auxiliary lens unit constituting said objective unit together with said partial objective unit set at the first position when said auxiliary lens unit is positioned at a second position on the optical axis of said objective system between said revolver and said tube lens unit positioned on an opposite side of said stage with respect to said revolver, wherein, when said objective system is constituted by said partial objective unit set at the first position, said auxiliary lens unit set at the second position, and said tube lens unit, a composite lateral magnification βa of said objective system satisfies the following condition:

$$|\beta a| \leq 1.5;$$

and a driving mechanism for changing a position of said auxiliary lens unit, said driving mechanism setting said auxiliary lens unit to at least one of the second position and a third position offset from the optical axis of said objective system.

2. An apparatus according to claim 1, wherein said partial objective unit comprises a first lens unit with a positive refracting power, and a second lens unit with a negative refracting power and positioned between said tube lens unit and said first lens unit when said partial objective unit is set at the first position, and wherein said auxiliary lens unit has a positive refracting power as a whole.

3. An apparatus according to claim 2, wherein, when said objective system is constituted by said partial objective unit set at the first position, said auxiliary lens unit set at the second position, and said tube lens unit, said observation apparatus satisfies the following conditions:

$$1 \leq (D+L)/fS \leq 1.5$$

$$50 \leq L \leq 200$$

$$12 \leq |\nu 1S - \nu 2S|$$

where

D: a parfocal distance for an objective in said observation apparatus fS: a focal length of said auxiliary lens unit ν1S: an Abbe number of a lens having the largest Abbe number within lenses in said auxiliary lens unit ν2S: an Abbe number of a lens having the smallest Abbe number within lenses in said auxiliary lens unit L: a distance between an attachment reference plane of said revolver for said partial objective unit set at the first position and a lens surface of said auxiliary lens unit which is closest to said tube lens unit.

4. An apparatus according to claim 3, wherein, when said objective system is constituted by said partial objective unit set at the first position, said auxiliary lens unit set at the second position, and said tube lens unit; said objective system satisfies the following condition:

$$0.07 \leq f1a/fa \leq 0.25$$

where f1a: a focal length of said first lens unit in said partial objective unit fa: a composite focal length of said objective unit constituted by said partial objective unit set at the first position and said auxiliary lens unit set at the second position.

5. An apparatus according to claim 3, wherein at least a first partial objective unit and a second partial objective unit which can be selected as said partial objective unit are attached to predetermined positions on said revolver;

wherein said first partial objective unit set at the first position constitutes a first objective system as said objective system together with said auxiliary lens unit set at the second position and said tube lens unit, and said second partial objective unit set at the first position constitutes a second objective system as said objective system together with said auxiliary lens unit set at the second position and said tube lens unit; and wherein at least one of said first and second partial objective units comprises a front lens unit with a positive refracting power as said first lens unit and a rear lens unit with a negative refracting power as said second lens unit, said rear lens unit being positioned between said front lens unit and said tube lens unit when said one of said first and second partial objective units is set at the first position.

6. An apparatus according to claim 5, wherein said observation apparatus satisfies the following condition:

$$1.25 \leq |\beta a|/|\beta b| \leq 2.75$$

where βa is a composite lateral magnification of said first objective system, and βb is a composite lateral magnification of said second objective system; and wherein at least one of said first and second objective systems satisfies the following conditions:

$$0.1 \leq f1b/fb \leq 0.5$$

$$0.2 \leq (t1b + t2b)/D \leq 0.8$$

where f1b: a focal length of said front lens unit in said one of said first and second partial objective units set at the first position fb: a composite focal length of said objective unit constituted by said one of said first and second partial objective units set at the first position, and said auxiliary lens unit set at the second position t1b: a total value of central thicknesses of respective lenses of said front lens unit in said one of said first and second partial objective units set at the first position t2b: a total value of central thicknesses of respective lenses of said rear lens unit in said one of said first and second partial objective units set at the first position D: a parfocal distance for an objective in said observation apparatus.

7. An apparatus according to claim 1, further comprising:
a detector for detecting at least a state in which said partial objective unit attached to said revolver is set at the first position; and
a controller for controlling said driving mechanism so as to set said auxiliary lens unit to at least one of the second position and the third position on the basis of information from said detector.

8. An apparatus according to claim 1, wherein said first objective unit converts a luminous flux from said object to a parallel luminous flux.

9. An apparatus according to claim 1, wherein said objective unit constituted by said partial objective unit and said auxiliary lens unit has a real field of view including a region having a diameter of 25 mm.

10. An apparatus according to claim 1, wherein said objective unit constituted by said partial objective unit and said auxiliary lens unit has a real field of view including a region having a diameter of 50 mm.

11. An observation apparatus having an objective system with an interchangeable objective unit and a tube lens unit set at a position to which a light beam is guided from said objective unit, thereby forming an observation image of an object at a predetermined magnification via said objective and tube lens units, comprising:
a stage allowing said object to be held on a major surface thereof;
a revolver to which a partial objective unit constituting part of said objective unit can be attached, said revolver setting said partial objective unit attached to said revolver at a first position on an optical axis of said objective system between said stage and said revolver, wherein said partial objective unit having a first lens unit with a positive refracting power, and a second lens unit with a negative refracting power which is positioned between said first lens unit and said tube lens unit when said partial objective unit is set at the first position;
an auxiliary lens unit constituting said objective unit together with said partial objective unit set at the first position when said auxiliary lens unit is positioned at a second position on the optical axis of said objective system between said revolver and said tube lens unit positioned on an opposite side of said stage with respect to said revolver, said auxiliary lens unit having a positive refracting power as a whole; and
a driving mechanism for changing a position of said auxiliary lens unit, said driving mechanism setting said auxiliary lens unit to at least one of the second position and a third position offset from the optical axis of said objective system,
wherein, when said objective system is constituted by said partial objective unit set at the first position, said auxiliary lens unit set at the second position, and said tube lens unit, said observation apparatus satisfies the following conditions:

$$1 \leq (D+L)/fS \leq 1.5$$

$$50 \leq L \leq 200$$

$$12 \leq |v1S - v2S|$$

where
D: a parfocal distance for an objective in said observation apparatus
fS: a focal length of said auxiliary lens unit
v1S: an Abbe number of a lens having the largest Abbe number within lenses in said auxiliary lens unit
v2S: an Abbe number of a lens having the smallest Abbe number within lenses in said auxiliary lens unit
L: a distance between an attachment reference plane of said revolver for said partial objective unit set at the first position and a lens surface of said auxiliary lens unit which is closest to said tube lens unit.

12. An apparatus according to claim 11, further comprising:
a detector for detecting at least a state in which said partial objective unit attached to said revolver is set at the first position; and
a controller for controlling said driving mechanism so as to set said auxiliary lens unit to at least either of the second position and the third position on the basis of information from said detector.

13. An apparatus according to claim 11, wherein, when said objective system is constituted by said partial objective unit set at the first position, said auxiliary lens unit set at the second position, and said tube lens unit, said objective system satisfies the following condition:

$$|\beta a| \leq 1.5$$

$$0.07 \leq f1a/fa \leq 0.25$$

where
$\beta a$: a composite lateral magnification of said objective system
$f1a$: a focal length of said first lens unit in said partial objective unit
$fa$: a composite focal length of said objective unit constituted by said partial objective unit set at the first position and said auxiliary lens unit set at the second position.

14. An apparatus according to claim 11, wherein at least a first partial objective unit and a second partial objective unit which can be selected as said partial objective unit are attached to predetermined positions on said revolver;
wherein said first partial objective unit set at the first position constitutes a first objective system as said objective system together with said auxiliary lens unit set at the second position and said tube lens unit, and said second partial objective unit set at the first position constitutes a second objective system as said objective system together with said auxiliary lens unit set at the second position and said tube lens unit; and
wherein at least one of said first and second partial objective units comprises a front lens unit with the positive refracting power as said first lens unit and a rear lens unit with the negative refracting power as said second lens unit, said rear lens unit being positioned between said front lens unit and said tube lens unit when said one of said partial objective units is set at the first portion.

15. An apparatus according to claim 14, wherein said observation apparatus satisfies the following condition:

$$1.25 \leq |\beta a|/|\beta b| \leq 2.75$$

where $\beta a$ is a composite lateral magnification of said first objective system, and $\beta b$ is a composite lateral magnification of said second objective system; and wherein at least one of said first and second objective systems satisfies the following conditions:

$$0.1 \leq f1b/fb \leq 0.5$$
$$0.2 \leq (t1b+t2b)D \leq 0.8$$

where
- f1b: a focal length of said front lens unit in said one of said first and second partial objective units set at the first position
- fb: a composite focal length of said objective unit constituted by said one of said first and second partial objective units set at the first position, and said auxiliary lens unit set at the second position
- t1b: a total value of central thicknesses of respective lenses of said front lens unit in said one of said first and second partial objective units set at the first position
- t2b: a total value of central thicknesses of respective lenses of said rear lens unit in said one of said first and second partial objective units set at the first position
- D: a parfocal distance for an objective in said observation apparatus.

16. An apparatus according to claim 11, wherein said first objective unit converts a luminous flux from said object to a parallel luminous flux.

17. An apparatus according to claim 11, wherein said objective unit constituted by said partial objective uit and said auxiliary lens unit has a real field of view including a region having a diameter of 25 mm.

18. An apparatus according to claim 11, wherein said objective unit constituted by said partial objective unit and said auxiliary lens unit has a real field of view including a region having a diameter of 50 mm.

19. A partial objective unit applicable to an observation apparatus having a revolver to which at least part of each of plural objective units can be attached, an objective system constituted by one selected from said plural objective units and a tube lens unit set at a position to which a light beam is guided from said selected objective unit, thereby forming an observation image of an object at a predetermined magnification via said selected objective unit and said tube lens unit, and an auxiliary lens unit constituting part of said selected objective unit when said auxiliary lens unit is set to an inserted position on an optical axis of said objective system between said selected objective unit and tube lens unit, wherein said partial objective unit is attachable to a predetermined position on said revolver of said observation apparatus, and constitutes said selected objective unit together with said auxiliary lens unit set at the inserted position when said partial objective unit is set at a setting position on the optical axis of said objective system;

wherein said partial objective unit comprises a first lens unit with a positive refracting power, and a second lens unit with a negative refracting power and positioned between said first lens unit and said tube lens unit when said partial objective unit is set at the setting position; and wherein, when said objective system is constituted by said partial objective unit set at the setting position, said auxiliary lens unit set at the inserted position, and said tube lens unit, said observation apparatus to which said partial objective unit is applied satisfies the following conditions:

$$|\beta a| \leq 1.5$$
$$0.07 \leq f1a/fa \leq 0.25$$

where
- βa: a composite lateral magnification of said objective system
- f1a: a focal length of said first lens unit in said partial objective unit
- fa: a composite focal length of said objective unit constituted by said partial objective unit set at the setting position and said auxiliary lens unit set at the inserted position.

20. A unit according to claim 19, wherein said partial objective unit constitutes said objective unit together with said auxiliary lens unit having a positive refracting power as a whole and satisfying the following conditions:

$$1 \leq (D+L)/fS \leq 1.5$$
$$50 \leq L \leq 200$$
$$12 \leq |\nu 1S - \nu 2S|$$

where
- D: a parfocal distance for an objective in said observation apparatus to which said partial objective unit is applied
- fS: a focal length of said auxiliary lens unit
- ν1S: an Abbe number of a lens having the largest Abbe number within lenses in said auxiliary lens unit
- ν2S: an Abbe number of a lens having the smallest Abbe lens within lenses in said auxiliary lens unit
- L: a distance between an attachment reference plane of said revolver for said partial objective unit set at the setting position and a lens surface of said auxiliary lens unit which is closest to said tube lens unit.

21. A partial objective unit according to claim 19, wherein said objective unit constituted by said partial objective unit and said auxiliary lens unit has a real field of view including a region having a diameter of 50 mm.

22. A partial objective unit applicable to an observation apparatus having a revolver to which at least part of each of plural objective units can be attached, an objective system constituted by one selected from said plural objective units and a tube lens unit set at a position to which a light beam is guided from said selected objective unit, thereby forming an observation image of an object at a predetermined magnification via said selected objective unit and said tube lens unit, and an auxiliary lens unit constituting part of said selected objective unit when said auxiliary lens unit is set to a inserted position on an optical axis of said objective system between said selected objective unit and tube lens unit, wherein said partial objective unit is attachable to a predetermined position on said revolver of said observation apparatus, and constitutes said selected objective unit together with said auxiliary lens unit set at the inserted position when said partial objective unit is set at a setting position on the optical axis of said objective system;

wherein said partial objective unit comprises a first lens unit with a positive refracting power, and a second lens unit with a negative refracting power and positioned between said first lens unit and said tube lens unit when said partial objective unit is set at the setting position; and wherein, when said objective system is constituted by said partial objective unit set at the setting position, said auxiliary lens unit set at the first position, and said tube lens unit, said observation apparatus to which said partial objective unit is applied satisfies the following conditions:

$|\beta a| \leq 1.5$ $0.1 \leq f1b/fb \leq 0.5$ $0.2 \leq (t1b+t2b)/D \leq 0.8$ where
- βa: a composite lateral magnification of said objective system
- f1b: a focal length of said first lens unit in said partial objective unit
- fb: a composite focal length of said first lens unit of said partial objective unit, said second lens unit of said partial objective unit, and said auxiliary lens unit
- t1b: a total value of central thicknesses of respective lenses of said first lens unit in said partial objective unit
- t2b: a total value of central thicknesses of respective lenses of said second lens unit in said partial objective unit
- D: a parfocal distance for an objective in said observation apparatus to which said partial objective unit is applied.

23. A unit according to claim 22, wherein said partial objective unit constitutes said objective unit together with said auxiliary lens unit having a positive refracting power as a whole and satisfying the following conditions:

$1 \leq (D+L)/fS \leq 1.5$ $50 \leq L \leq 200$ $12 \leq |v1S-v2S|$ where
- D: a parfocal distance for an objective in said observation apparatus to which said partial objective unit is applied
- fS: a focal length of said auxiliary lens unit
- v1S: an Abbe number of a lens having the largest Abbe number within lenses in said auxiliary lens unit
- v2S: an Abbe number of a lens having the smallest Abbe number within lenses in said auxiliary lens unit
- L: a distance between an attachment reference plane of said revolver for said partial objective unit set at the setting position and a lens surface of said auxiliary lens unit which is closest to said tube lens unit.

24. A partial objective unit according to claim 22, wherein said objective unit constituted by said partial objective unit and said auxiliary lens unit has a real field of view including a region having a diameter of 25 mm.

25. An auxiliary lens unit applicable to an observation apparatus having a revolver to which at least part of each of plural objective units can be attached, an objective system constituted by one selected from said plural objective units and a tube lens unit set at a position to which a light beam is guided from said selected objective unit, thereby forming an observation image of an object at a predetermined magnification via said selected objective unit and said tube lens unit, and a partial objective unit constituting part of said selected objective unit when said partial objective unit is set at a first position on an optical axis of said objective system which is being attached to said revolver, wherein said auxiliary lens unit can be set at a second position on the optical axis of said objective system between said partial objective unit set at the first position and said tube lens unit, and constitutes said selected objective unit together with said partial objective unit set at the first position when said auxiliary lens unit is set at the second position on the optical axis of said objective system;

wherein said auxiliary lens unit has a positive refracting power as a whole; and wherein, when said objective system is constituted by said partial objective unit set at the first position, said auxiliary lens unit set at the second position, and said tube lens unit, said observation apparatus to which said auxiliary lens unit is applied satisfies the following conditions:

$1 \leq (D+L)/fS \leq 1.5$ $50 \leq L \leq 200$ $12 \leq |v1S-v2S|$ where
- D: a parfocal distance for an objective in said observation apparatus to which said partial objective unit is applied
- fS: a focal length of said auxiliary lens unit
- v1S: an Abbe number of a lens having the largest Abbe number within lenses in said auxiliary lens unit
- v2S: an Abbe number of a lens having the smallest Abbe number within lenses in said auxiliary lens unit
- L: a distance between an attachment reference plane of said revolver for said partial objective unit set at the first position and a lens surface of said auxiliary lens unit which is closest to said tube lens unit.

26. An auxiliary lens unit according to claim 25, wherein said auxiliary lens unit gives said partial objective unit its real field of view including a region having a diameter of 25 mm.

27. An auxiliary lens unit according to claim 25, wherein said auxiliary lens unit gives said partial objective unit its real field of view including a region having a diameter of 50 mm.

28. An observation apparatus having an objective system with an interchangeable objective unit and a tube lens unit set at a position to which a light beam is guided from said objective unit, thereby forming an observation image of an object at a predetermined magnification via said objective an tube lens units, comprising:

main body;

a stage, connected to said main body, capable of allowing said object to be held on a major surface thereof;

a revolver, connected to said main body, to which a partial objective unit constituting part of said objective unit can be attached, said revolver setting said partial objective unit attached to said revolver at a first position on an optical axis of said objective system between said stage and said revolver;

an auxiliary lens unit constituting said objective unit together with said partial objective unit set at the first position when said auxiliary lens unit is positioned at a second position on the optical axis of said objective system between said revolver and said tube lens unit positioned on an opposite side of said stage with respect to said revolver, wherein, when said objective system is constituted by said partial objective unit set at the first position, said auxiliary lens unit set at the second position, and said tube lens unit, a composite lateral magnification βa of said objective system satisfies the following condition: $|\beta a| \leq 1.5$; and a lens frame which holds said auxiliary lens unit so that said auxiliary lens unit is capable of positioning at least one of the second position and a third position offset from the optical axis of said objective system.

29. An apparatus according to claim 28, wherein said partial objective unit comprises a first lens unit with a positive refracting power, and a second lens unit with a negative refracting power and positioned between said tube lens unit and said first lens unit when said partial objective unit is set at the first position, and wherein said auxiliary lens unit has a positive refracting power as a whole.

30. An apparatus according to claim 19, wherein, when said objective system is constituted by said partial objective unit set at the first position, said auxiliary lens unit set at the second position, and said tube lens unit, said observation apparatus satisfies the following conditions:

$$1 \leq (D=L)/fS \leq 1.5$$

$$50 \leq L \leq 200$$

$$12 \leq |v1S-v2S|$$

where

D: a parfocal distance for an objective in said observation apparatus fS: a focal length of said auxiliary lens unit v1S: an Abbe number of a lens having the largest Abbe number within lenses in said auxiliary lens unit v2S: an Abbe number of a lens having the smallest Abbe number within lenses in said auxiliary lens unit L: a distance between an attachment reference plane of said revolver for said partial objective unit set at the first position and a lens surface of said auxiliary lens unit which is closest to said tube lens unit.

31. An apparatus according to claim 30, wherein, when said objective system is constituted by said partial objective unit set at the first position, said auxiliary lens unit set at the second position, and said tube lens unit, said objective system satisfies the following condition:

$$0.07 \leq f1a/fa \leq 0.25$$

where f1a: a focal length of said first lens unit in said partial objective unit a composite focal length of said objective unit constituted by said partial objective unit set at the first position and said auxiliary lens unit set at the second position.

32. An apparatus according to claim 30, wherein at least a first partial objective unit and a second partial objective unit which can be selected as said partial objective unit are attached to predetermined positions on said revolver;

wherein said first partial objective unit set at the first position constitutes a first objective system as said objective system together with said auxiliary lens unit set at the second position and said tube lens unit, and said second partial objective unit set at the first position constitutes a second objective system as said objective system together with said auxiliary lens unit set at the second position and said tube lens unit; and wherein at least one of said first and second partial objective units comprises a front lens unit with a positve refracting power as said first lens unit and a rear lens unit with negative refracting power as said second lens unit, said rear lens unit being positioned between said front lens unit and said tube lens unit when said one of said first and second partial objective units is set at the first position.

33. An apparatus according to claim 32, wherein said observation apparatus satisfies the following condition:

$$1.25 \leq |\beta a|/|\beta b| \leq 2.75$$

where βa is a composite lateral magnification of said first objective system, and βb is a composite lateral magnification of said second objective system; and wherein at least one of said first and second objective systems satisfies the following conditions:

$$0.1 \leq f1b \leq 0.5$$

$$0.2 \leq (t1b = t2b)/D \leq 0.8$$

where f1b: a focal length of said front lens unit in said one of said first and second partial objective units set at the first position fb a composite focal length of said objective unit constituted by said one of said first and second partial objective units set at the first position, and said auxiliary lens unit set at the second position t1b: a total value of central thicknesses of respective lenses of said front lens unit in said one of said first and second partial objective units set at the first position t2b: a total value of central thicknesses of respective lenses of said rear lens unit in said one of said first and second partial objective units set at the first position D: a parfocal distance for an objective in said observation apparatus.

34. An apparatus according to claim 28, wherein said first objective unit converts a luminous flux from said object to a parallel luminous flux.

35. An apparatus according to claim 28, wherein said objective unit constituted by said partial objective unit and said auxiliary lens unit has a real field of view including a region having a diameter of 25 mm.

36. An apparatus according to claim 28, wherein said objective unit constituted by said partial objective unit and said auxiliary lens unit has a real field of view including a region having a diameter of 50 mm.

37. A method of fabricating an observation apparatus comprising an objective system having a first objective unit being changeable and a second objective unit arranged at a position where a luminous flux from said first objective unit is guided, and forming an observation image of said object which has a predetermined magnification and is formed through said first and second objective units, said method comprising the steps of:

preparing a main body;

preparing a stage capable of allowing said object to be held on a major surface thereof;

preparing a partial objective unit constituting part of said first objective unit;

preparing said second objective unit;

preparing a revolver to which said partial objective unit can be attached;

attaching said stage and said revolver to said main body; and preparing an auxiliary lens unit, wherein said revolver sets said partial objective unit attached to said revolver at a first position on an optical axis of said objective system between said stage and said revolver, wherein said auxiliary lens unit constitutes said first objective unit together with said partial objective unit set at the first position when said auxiliary lens unit is positioned at a second position on the optical axis of said objective system between said revolver and said second objective unit positioned on an opposite side of said stage with respect to said revolver, wherein, when said objective system is constituted by said partial objective unit set at the first position, said auxiliary lens unit set at the second position, and said second objective unit, a composite lateral magnification $\beta a$ of said objective system satisfies the following condition:

$|\beta a| \leq 1.5$, and wherein said auxiliary lens unit is attachable to said main body so that said auxiliary lens unit is capable of positioning at least one of the second position and a third position offset from the optical axis of said objective system.

* * * * *